(12) United States Patent
Oliver et al.

(10) Patent No.: US 10,173,621 B2
(45) Date of Patent: Jan. 8, 2019

(54) RETRACTABLE UNDER-GUARD FOR VEHICLES AND EQUIPMENT

(71) Applicant: ANDERSON & WOOD CONSTRUCTION CO., INC., Meridian, ID (US)

(72) Inventors: Fred S. Oliver, Eagle, ID (US); Michael R. Bruett, Caldwell, ID (US); Chase C. Oliver, Meridian, ID (US); Lee M. Ward, Meridian, ID (US)

(73) Assignee: ANDERSON & WOOD CONSTRUCTION CO., INC., Meridian, ID (US)

( * ) Notice: Subject to any disclaimer, the term of this patent is extended or adjusted under 35 U.S.C. 154(b) by 0 days.

(21) Appl. No.: 15/634,910

(22) Filed: Jun. 27, 2017

(65) Prior Publication Data

US 2018/0126935 A1 May 10, 2018

Related U.S. Application Data

(60) Provisional application No. 62/355,764, filed on Jun. 28, 2016.

(51) Int. Cl.
*B60R 19/56* (2006.01)
*B60R 19/34* (2006.01)
(Continued)

(52) U.S. Cl.
CPC ............ *B60R 19/56* (2013.01); *B60R 19/023* (2013.01); *B60R 19/34* (2013.01); *B60R 19/38* (2013.01); *B60R 19/565* (2013.01)

(58) Field of Classification Search
CPC ........ B60R 19/56; B60R 19/565; B60R 19/44
(Continued)

(56) References Cited

U.S. PATENT DOCUMENTS 2,890,076 A * 6/1959 Baechler ................ B60R 19/56
 256/13.1
3,913,963 A 10/1975 Persicke
(Continued)

OTHER PUBLICATIONS

Bloch et al., Improved Crashworthy Designs for Truck Underside Guards, Paper No. 98-S4-O-07, presented at the 16th International Technical Conference on the Enhanced Safety of Vehicles in Windsor, Ontario, Canada, Oct. 1998, pp. 1-13 & 841, http://www.autosafetyexpert.com/Assets/Docs/article-underride.pdf.

*Primary Examiner* — Dennis H Pedder
(74) *Attorney, Agent, or Firm* — Pedersen and Company, PLLC; Ken J. Pedersen; Barbara S. Pedersen

(57) ABSTRACT

A retractable under-guard, for example for dual-purpose trucks that travel on-road and off-road, provides impact protection to other vehicles colliding with the truck, but is raised for off-road travel to avoid obstacles. The under-guard connects by a frame wrap to horizontal frame beam(s) of many different trucks and does not hang down in its retracted position to an extent that it interferes with off-road travel. For entering the road, the guard frame pivots downward to the desired position at or near the outer perimeter of the truck, and typically about half way between the truck frame and the ground in the space into which a lower vehicle would enter in a collision. Hook and pin systems, and/or impact plates, maintain the under-guard in proper position upon an impact. The under-guard system may automatically deploy above a predetermined truck speed, to ensure deployment when the truck re-enters the roads.

21 Claims, 27 Drawing Sheets

(51) Int. Cl.
*B60R 19/38* (2006.01)
*B60R 19/02* (2006.01)

(58) Field of Classification Search
USPC .................. 293/102, 103, 118, 142, 34
See application file for complete search history.

(56) References Cited

U.S. PATENT DOCUMENTS

| | | | | |
|---|---|---|---|---|
| 4,026,590 A | * | 5/1977 | Holm | B60R 19/56 293/118 |
| 4,410,207 A | * | 10/1983 | Scharf | B60R 19/56 293/118 |
| 4,582,351 A | * | 4/1986 | Edwards | B60R 19/56 293/102 |
| 4,641,871 A | | 2/1987 | Vaughn | |
| 5,257,842 A | | 11/1993 | Sherno | |
| 5,360,311 A | | 11/1994 | Lutz et al. | |
| 5,507,546 A | | 4/1996 | Holley | |
| 5,520,428 A | * | 5/1996 | Bell | B60R 19/38 293/102 |
| 6,089,629 A | | 7/2000 | Hope et al. | |
| 6,109,675 A | | 8/2000 | Sumrall | |
| 6,116,667 A | | 9/2000 | Torcomian | |
| 6,176,529 B1 | | 1/2001 | Kitzmiller et al. | |
| 6,764,116 B2 | | 7/2004 | Ledford et al. | |
| 6,814,378 B1 | | 11/2004 | Marmur | |
| 6,962,378 B2 | | 11/2005 | Ledford et al. | |
| 7,530,612 B2 | | 5/2009 | Regnell et al. | |
| 7,686,385 B2 | | 3/2010 | Dolan et al. | |
| 8,317,239 B2 | * | 11/2012 | Martin | B60R 19/38 293/102 |
| 9,555,755 B2 | * | 1/2017 | Franiak | B60R 19/26 |
| 2001/0030431 A1 | | 10/2001 | Killday | |
| 2005/0017519 A1 | | 1/2005 | Regnell et al. | |
| 2006/0119116 A1 | | 6/2006 | Goertz | |
| 2011/0260477 A1 | * | 10/2011 | Martin | B60R 19/38 293/118 |

* cited by examiner

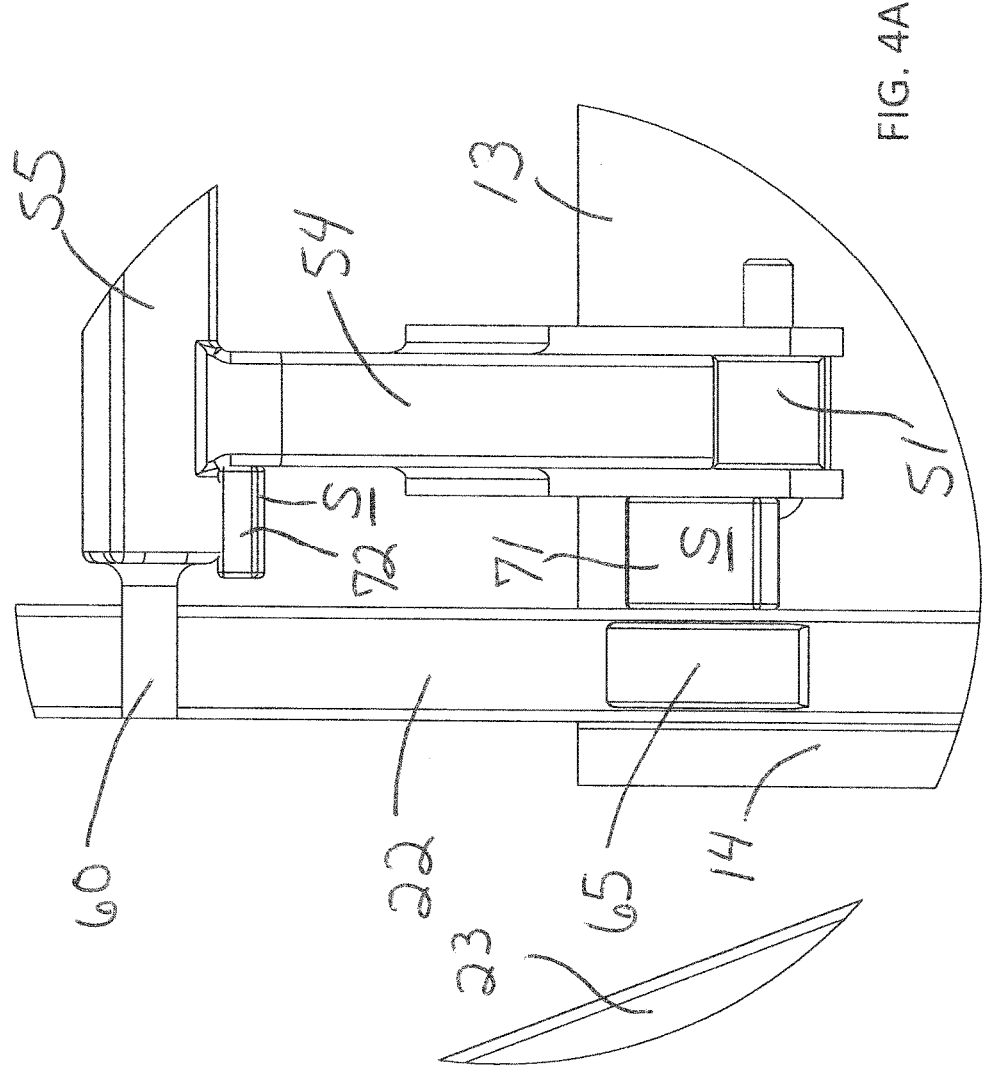

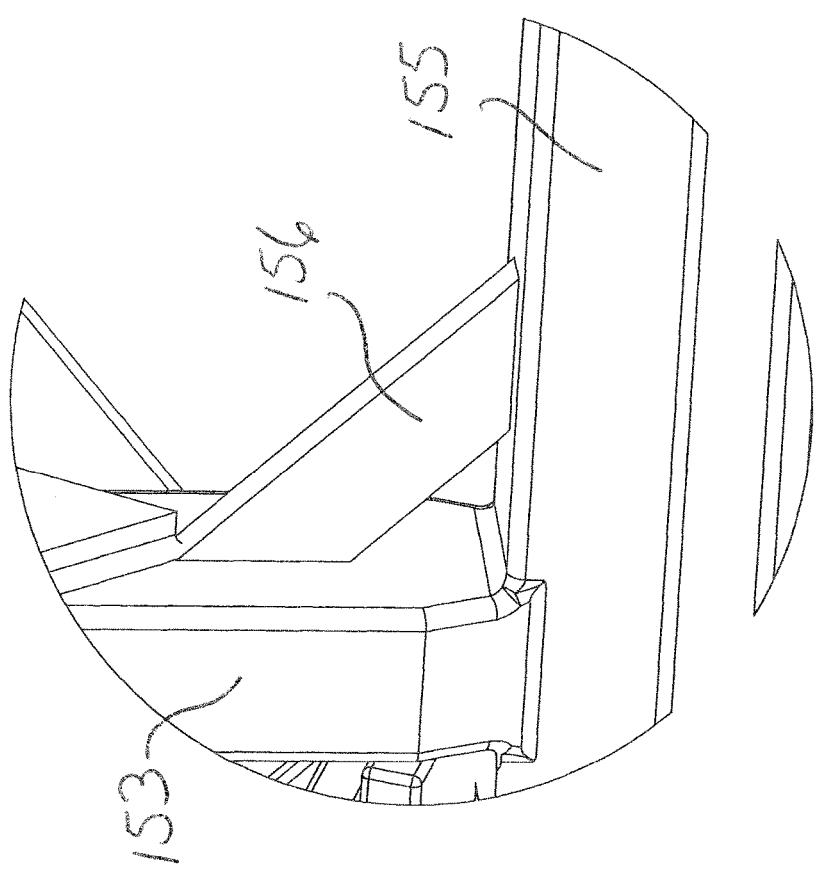

RETRACTABLE UNDER-GUARD FOR VEHICLES AND EQUIPMENT

This application claims benefit of Provisional Application Ser. 62/355,764, filed Jun. 28, 2016, which is incorporated hereby by this reference.

BACKGROUND

Field of the Technology

This disclosed technology relates generally to vehicle highway safety. More specifically, this disclosed technology relates to a retractable collision under-guard for vehicles and equipment, which is especially beneficial for vehicles and equipment that do both on-road and off-road duty, for example, construction, utility, repair and rescue vehicles/equipment.

Related Art

U.S. Pat. No. 5,360,311 (Lutz, et al.) discloses a collision underride protector or "car catcher" for a roll-off hoist truck. Chains connect the hoist truck frame to the car catcher, which has a pivotal latch lever moved by the same actuator used to raise and lower the catcher, the latch lever being in a confronting relation with a jam lock to prevent unwanted movement of the catcher.

A paper #98-S4-0-07, Improved Crashworthy Designs for Truck Underride Guards, discloses on page 838 a rear underride guard for dump trucks. The guard is normally in a down position when the truck is traveling on roads, but may be retracted pivotally upward when the truck is performing its dump function at a worksite.

U.S. Pat. No. 8,317,239 (Martin, et al.) discloses an adjustable-height, flip-up front bumper assembly that may be operated as a preventative measure when traveling off-road or over obstacles.

Still, there is a need for a retractable under-guard for dual-purpose, on-road and off-road, trucks, wherein "off-road" includes traveling off the road in a field, wilderness, median strip, or un-paved area, such as in a construction site, a remote utility-repair area, or other "natural" rough, uneven, and/or obstacle-filled area. According to current safety regulations, the guard needs to be lowered for on-road travel to provide rear impact protection for other vehicles in the event of a collision with the truck. However, for off-road travel, the guard needs to be retracted, lifted, or otherwise raised, so that the guard is less likely to be bent or otherwise damaged and does not interfere with the truck's travel over or near deep ruts, ditches, holes, projecting rocks, scattered tree and brush stumps and limbs, and/or other debris or hazards. Therefore, in certain embodiments there is a need to raise the guard for off-road travel and work because of a natural or rough surface environment rather than because the truck bed is to be tilted for unloading of cargo. Further, there is a need for such a dual-purpose under-guard that may be retained in a deployed position by locks/reinforcements that automatically become effective due to the under-guard moving into the deployed position. There is a need for such an under-guard that is resistant, for example, by these locks/reinforcements, to collision/impact from the rear, side, and front of the guard. Certain embodiments of the invention address one or more of these needs.

SUMMARY

The invention comprises a retractable under-guard and/or methods for installing and/or using the under-guard on various types of vehicles and equipment. The retractable under-guard is especially useful for dual-purpose off-road and on-road vehicles and equipment such as construction, repair, utility, repair and rescue vehicles and equipment. For example, the under-guard raises to a retracted/undeployed position for off-road use so that the under-guard can avoid obstacles such as debris and hazards, and lowers to an extended/deployed position for on-road use in which the under-guard provides impact protection to other vehicles that may collide with the dual-purpose vehicle or equipment.

The retraction and deployment of the under-guard are done by an actuator frame that pivots from a horizontal or generally-horizontal retracted/raised position to a vertical or generally-vertical deployed/lowered position. The actuator frame preferably has extension(s) that extend(s) under and slidably support the guard frame preferably at all times and in all positions of the actuator frame. Therefore, pivoting of the actuator frame to the deployed/lowered position allows the guard frame to pivot/swing by gravity down from its horizontal or generally-horizontal retracted position to its deployed position in which the guard frame slants downward from the connector to place a main guard bar at the appropriate level between the vehicle or equipment on which the under-guard is being used (hereafter, simply "truck") and the road, near the outer perimeter of the truck, to serve as a barrier that prevents "underride" of a car/vehicle underneath the truck during a collision. Preferably, the under-guard comprises locks/latches that automatically become effective due to the under-guard moving into the deployed position. The under-guard main guard bar may be curved and/or straight and may exist across part or all of the front, left and/or right side, or rear of the truck, including a bed attached to the truck and/or a separate trailer attached to the truck.

Certain embodiments of the under-guard may be operated automatically or manually as with a button or lever. Certain embodiments of the under-guard may be actuated/operated by various actuators and various power inputs, such as electrical, hydraulic or air/pneumatic, spring, airbag, or manual (by hand, as with a wheel or lever handle).

Preferably, the under-guard comprises a truck-connection sub-frame assembly for securement to the frame of the truck. The truck-connection sub-assembly is preferably a generally U-shaped bracket with a horizontal main body and right and left upending plates, thus, forming a "frame wrap" that is conveniently bolted to one or more horizontal beam(s) of the truck frame, with the main body extending underneath the beam and the right and left upending plates extending up along the right and left sides of the beam(s). None of the moving parts of the under-guard, particularly none of the guard frame, actuator frame, and actuator, protrudes, in either the retracted/raised or deployed/lowered positions, above the horizontal plane of said horizontal main body of the frame wrap. This makes the under-guard very universal, in that it may fit and connect to many different trucks without modification of the under-guard or the truck.

In-board (proximal) near both sides of the frame wrap is a set of back pivotal connections for a guard frame. Also in-board, in the middle of the frame wrap, is a connection for the proximal end of an actuator, for example, a pneumatic or hydraulic actuator. Outboard (distal) on both sides of the frame wrap is a set of front pivotal connections for an actuator frame. The actuator frame depends pivotally from the frame wrap, and is operatively in contact with, the distal end of the actuator. The actuator frame has a central, lower bar for receiving/connecting-to the actuator distal end, the lower bar having outside ends for supporting and sliding relative to bottom parts of the guard frame. Extension of the actuator distal end rotates/pivots the actuator frame rearwardly (distally, in the out-board direction) causing the outside ends of the actuator frame lower bar to lift upwardly on bottom parts of the guard frame, thereby lifting and raising the guard frame to the retracted, un-employed position. By the time of full extension of the actuator, both of the preferred actuator frame and the preferred guard frame are horizontal or nearly horizontal.

In the reverse, retraction of the actuator, to pull the actuator distal end forward (proximally, in the in-board direction), pulls the actuator frame down and rearward, and, as it rotates/pivots at its connections to the truck-connection sub-frame, lowers the actuator frame lower bar to lower the guard frame into the extended, deployed position. By the time of full retraction of the actuator, the preferred actuator frame is vertical or nearly vertical, and the preferred guard frame is fully deployed to an angle, for example, in the range of about 25-70 degrees, more preferably in a range of 15-45 degrees, or more preferably in a range of 15-25 degrees from horizontal (see FIG. 9).

In certain embodiments, the operation and contact of the actuator frame lower bar is accomplished by pins or other elongations extending from right and left ends of the lower bar and sliding along and under the underside of right and left portions of the guard frame. In certain embodiments, the guard frame rests on said pins/elongations with the underside of said portions simply resting on and sliding on the pins/elongations as the guard frame pivots/swings between its retracted and deployed positions.

In the preferred embodiment, when the guard frame is in the fully-deployed position, the pins/elongations slide back into hook members on said portions of the guard frame. Therefore, the pin-in-hook system serves one, or preferably both, of the following functions: 1) retaining under normal circumstances (within the limits of the strength of an air or hydraulic cylinder or other actuator) the pins inside the hooks, and hence, retaining the actuator frame in a particular position for a particular position of the deployed guard frame; and 2) a latch to limit upward movement and also downward movement of the guard frame when in the deployed position, until the operator or other control chooses to lift the guard frame. The pins/elongations automatically slide into the hook members as part of, and without interfering with, the deployment process. Also, the pin/elongations automatically slide out of the hook members as part of, and without interfering with, the retraction process. Therefore, the deployment process and controls latch/lock the pins/elongations in the hook members and, likewise, the retraction process and controls unlatch/unlock the pins/elongations from the hook members; no additional controls, moving parts, or operator actions are required for this latching/locking or this unlatching/unlocking.

These pin-in-hook latch functions may be important especially in the event of an impact on the guard frame. As is well-known in the art, a properly-placed under-guard is important and/or legally required, as its proper-placement may be the only barrier to prevent other vehicles from becoming wedged or smashed underneath a typically much higher-off-the-road truck-bed. For example, the pin-in-hook latch helps prevent a collision or impact, for example, from any direction but particularly from the front or side of the guard frame and particularly from the close to the ground, from pivoting the guard frame upward into a dangerous position that allows a vehicle to crash underneath the guard frame of the under-guard. Further, the pin-in-hook latch helps prevent any collision, for example, particularly from the rear of the truck, from forcing the guard frame of the under-guard to pivot further down and forward from its proper-placement, into a dangerous position that allows a vehicle to crash "over" the guard frame.

Other or additional latching/locking may be included in certain embodiments, in the form of plates or other cooperating stop members. For example, said other or additional latching/locking may comprise one or more plate/stop members on each of the guard frame and the actuator frame, which automatically come close or abut each other upon full deployment of the guard frame. These cooperating plates/stops resist relative movement of the actuator frame and the deployed guard frame upon collision or impact. The plates/stops preferably have relatively large surface areas that are close/abutting for absorption/dissipation of large impact forces, and this further ensures that the guard frame will not pivot out of its proper place upon collision/impact from the rear of the truck. The plates automatically move to be close/abutting as part of, and without interfering with, the deployment process. Also, the plates automatically move apart as part of, and without interfering with, the retraction process. Therefore, no separate or additional controls, moving parts, or operator actions are required for this latching/locking or unlatching/unlocking.

BRIEF DESCRIPTION OF THE DRAWINGS

FIG. 4A is an enlarged detail view of the region circled in FIG. 4.

FIG. 26 is an enlarged rear detail view, of the area circled in FIG. 22, showing interior reinforcement for the actuator frame of the under-guard of FIG. 18.

DETAILED DESCRIPTION OF CERTAIN EMBODIMENTS

Figure 1:
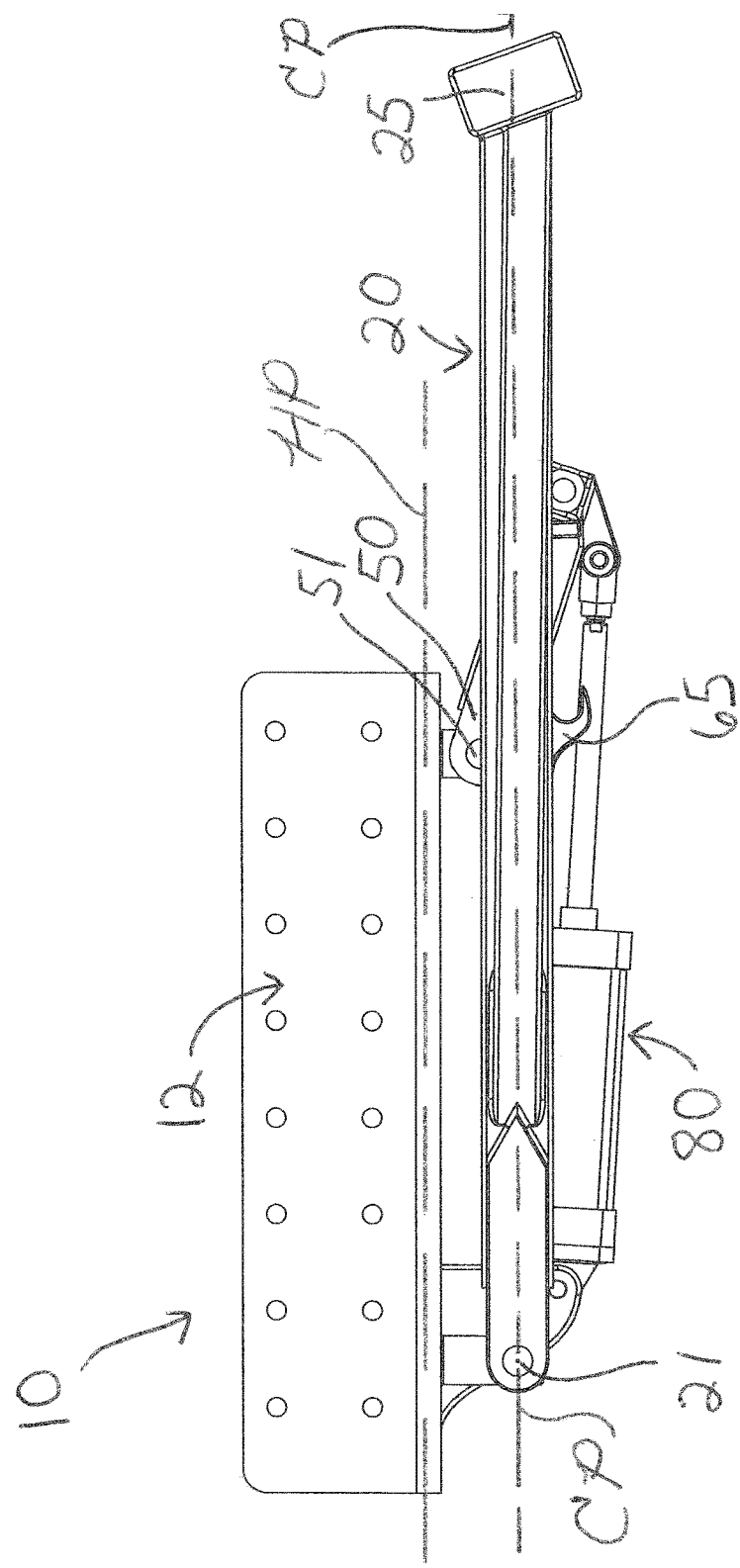
FIG. 1 is a left side view of one embodiment of the disclosed under-guard in the retracted (not deployed) position.
Figure 2:
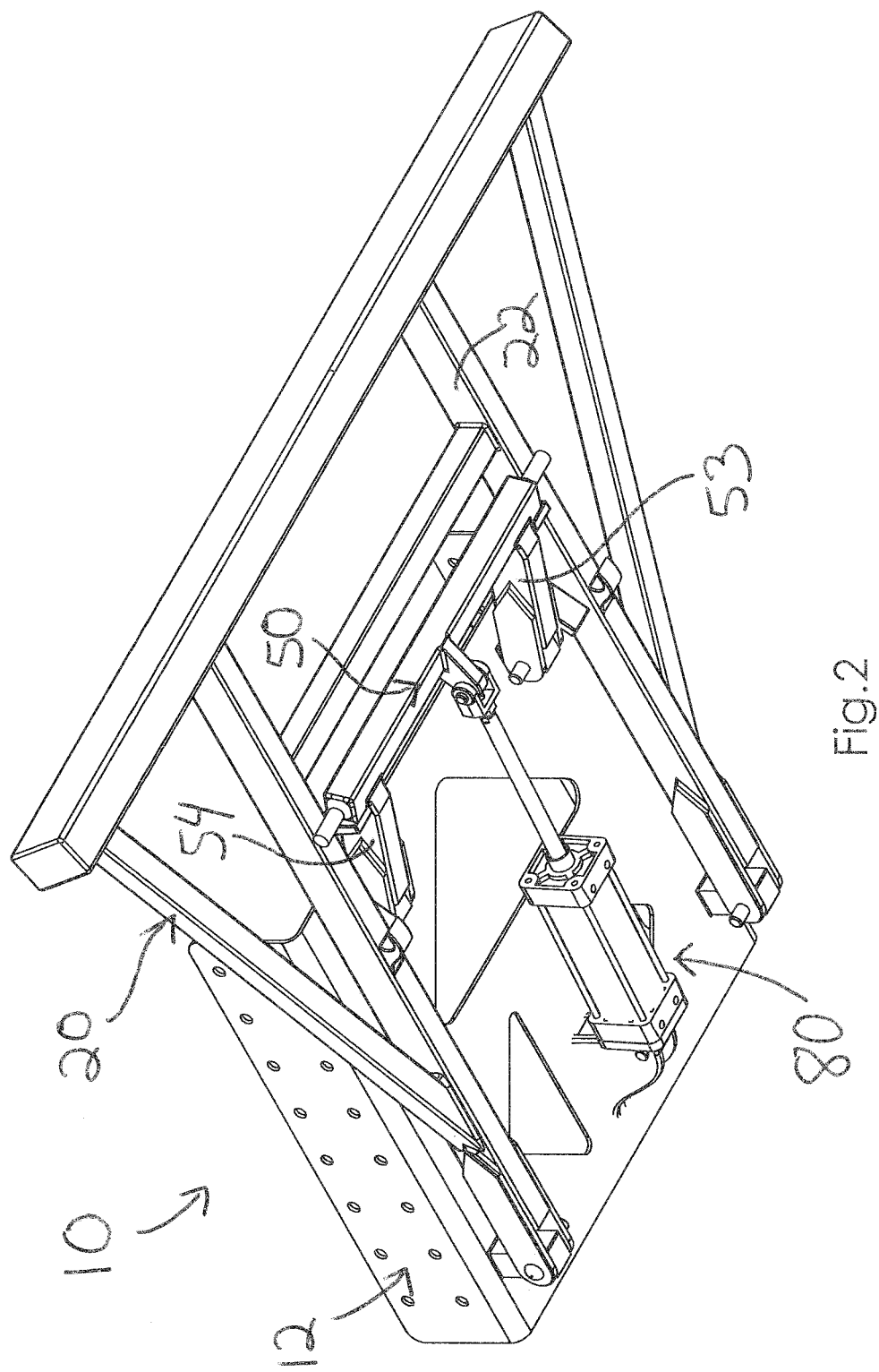
FIG. 2 is a left-bottom perspective view of the under-guard of FIG. 1 in the retracted position.
Figure 3:
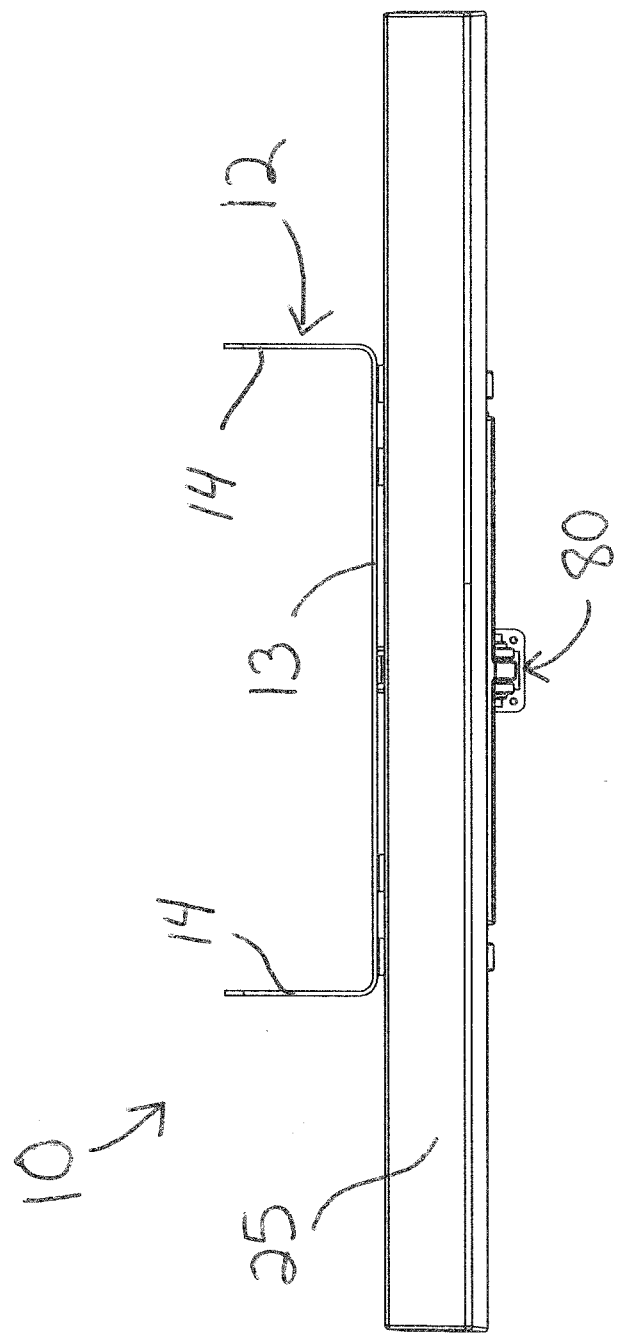
FIG. 3 is a rear view of the under-guard of FIG. 1 in the retracted position.

Referring to the Figures, there are shown some, but not all, embodiments of the invented under-guard. The preferred embodiment of the under-guard, when portrayed connected to a truck in the Figures, is shown connected near the rear end of the truck, with the guard frame extending down and rearward when in the deployed position. This portrayed position on the truck, therefore, is especially-preferred for rear-end collisions of another vehicle with the truck. This portrayed position on the truck, however, may also be effective for collisions from a side of the truck that contact the left or the right side and/or the front of the guard frame. This multi-directional effectiveness results from the latching/locking adaptation(s) keeping the deployed guard frame in place upon impact on said sides or front of the guard frame as well as upon impact on the rear of the guard frame.

Alternatively or additionally, one or more under-guards may be positioned at different locations on the truck, for example, at the front, left, and/or right side of the truck. Based on the description, and based on the drawings herein that show a rear-of-the-truck installation, one of skill in the art will understand the under-guard and its operation and use in other locations on the truck.

The under-guard 10 is shown in the retracted (un-deployed) position in FIGS. 1-6, not connected to a vehicle. The under-guard 10 is shown in the deployed position in FIGS. 7-13, not connected to a vehicle. The under-guard 10 is shown connected, in an exemplary location on an exemplary truck, in a retracted position in FIGS. 14 and 15 and in a deployed position in FIGS. 16 and 17. An alternative embodiment of the under-guard 100 is shown in FIGS. 18-26, and it will be understood from this description and the drawings to be structured much like, and to operate much like, under-guard 10.

The under-guard 10 moves from the retracted (un-deployed) position to the deployed position, preferably controlled by an operator/driver of the vehicle on which the under-guard is installed. This may be done remotely by pressing a switch, button, or other operator control in the truck cab, as it is preferred that the retraction is done when the operative/driver chooses to leave the road, to enter an unpaved, obstacle-filled, or other natural or rough terrain, as described above in the Summary. This "leaving the road" is typically not simply going to a loading dock inside a business perimeter or tilting the truck bed to unload cargo, but rather going to and traveling in said natural or rough terrain that can have obstacles such as limbs, rocks, ditches, or ruts.

The under-guard is installed by bolting or other attachment to a frame portion of a vehicle. The preferred connection is done by a frame wrap unit 12 that is generally U-shaped in that it has a horizontal main body/plate 13 (see horizontal plane HP, extending into the sheet, in FIGS. 1 and 9), and two upending wings/plates 14 (FIGS. 3 and 5), to "wrap" around three sides of a frame member such as a frame beam. All of the other portions of the under-guard 10 depending from the frame wrap unit 12, to be lower than the wrap unit 12 in both the retracted and the deployed positions. This way the under-guard 10 may be installed/retrofit conveniently on a large number of different vehicles as no part of the under-guard 10 has to fit up into spaces in the truck undercarriage except for the plates of the wrap unit 12 being secured to a frame beam. The wrap unit may extend up around a single frame beam, but in many embodiments the wrap unit 12 extends up around two spaced-apart frame beams under the truck bed and/or trailer bed, for example the two spaced-apart frame beams B shown to best advantage in FIGS. 14 and 17. Other connections may be used in place of the wrap unit 12 in certain embodiments. However, like the wrap unit 12, the preferred connections comprise adaptations to be minimally-invasive into the undercarriage of the truck and being "universal" to many trucks, so that the under-guard may be sold as a retrofit item for many trucks, as well as being an OEM device.

The retracted position of the under-guard 10, as shown in FIGS. 1-6, 14 and 15, provides a very thin (top to bottom) profile for the entire under-guard. Preferably, the under-guard in the retracted position extends only a short distance, for example, less than 8 inches, 6-8 inches, or more preferably about 7 inches, down from the horizontal main plate of the wrap unit 12. Thus, the under-guard 10 (preferably only frame wrap 12) extends up only a very small distance into the truck structure, and when retracted extends down only a very small distance from the truck structure to which it is attached so that the under-guard 10 does not interfere with off-road truck travel over or near debris or hazards. When deployed for over-the-road travel, as shown in FIGS. 7-13, 16 and 17, the under-guard 10 extends down toward the road an appropriate distance to comply with safety regulations, and importantly to "catch" cars and other vehicles in the event of a collision that might otherwise allow "underride" of the car/vehicle underneath the truck.

On may see from all the Figures that the under-guard comprises, in addition to the frame wrap 12 or other connector to the truck, a guard frame 20, an actuator frame 50, and an actuator that may be a hydraulic cylinder actuator 80, for example. The guard frame 20 is a generally planar frame structure, as may be seen to best advantage in FIG. 1, wherein the plane (or "central plane CP" extending into the sheet, in FIG. 1) of guard frame 20 is horizontal or generally horizontal, for example, 0 to 5, and more preferably 0 to 3 degrees, from horizontal, in the retracted position. The guard frame is pivotally connected to the wrap unit 10 at its front pivot points 21. The preferred guard frame 20 comprises multiple bars/beams 22 that extend from those pivot points, plus "triangular" bars 23 that extend rearward from bars 22, reinforcing cross-member(s) 24, and rear main guard bar 25. The main guard bar 25 is fixed to the rear ends of bars 22 and 23, and, as the rear-extremity of the under-guard 10, is expected to be the main element/obstacle preventing a vehicle from moving under the truck during a rear collision with the truck. This main guard bar 25 is configured to extend across most of the width of the rear of the vehicle and will be at the legal height relative to the road and the truck/trailer bed when deployed.

Figure 4:
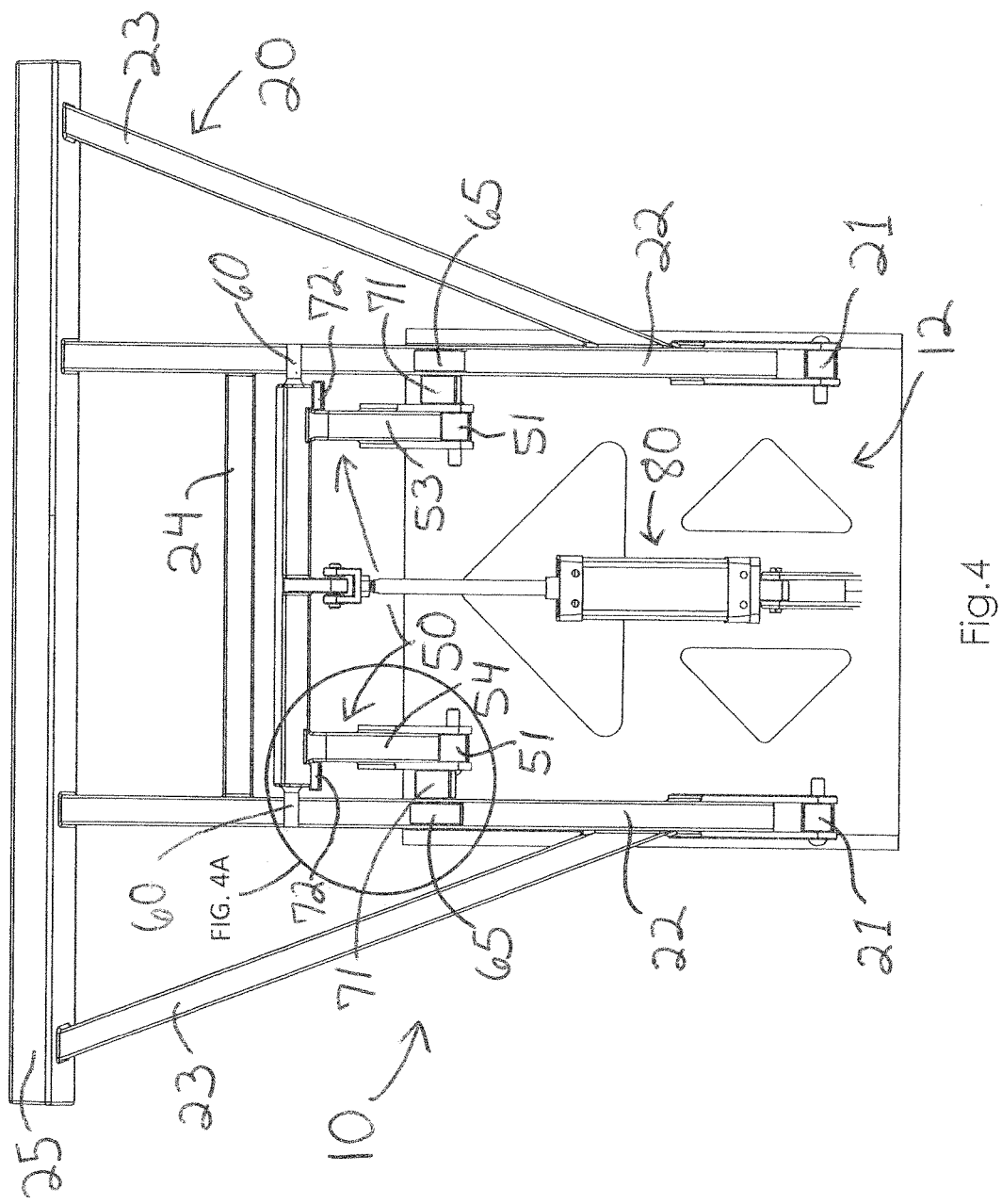
FIG. 4 is a bottom view of the under-guard of FIG. 1 in the retracted position.
Figure 5:
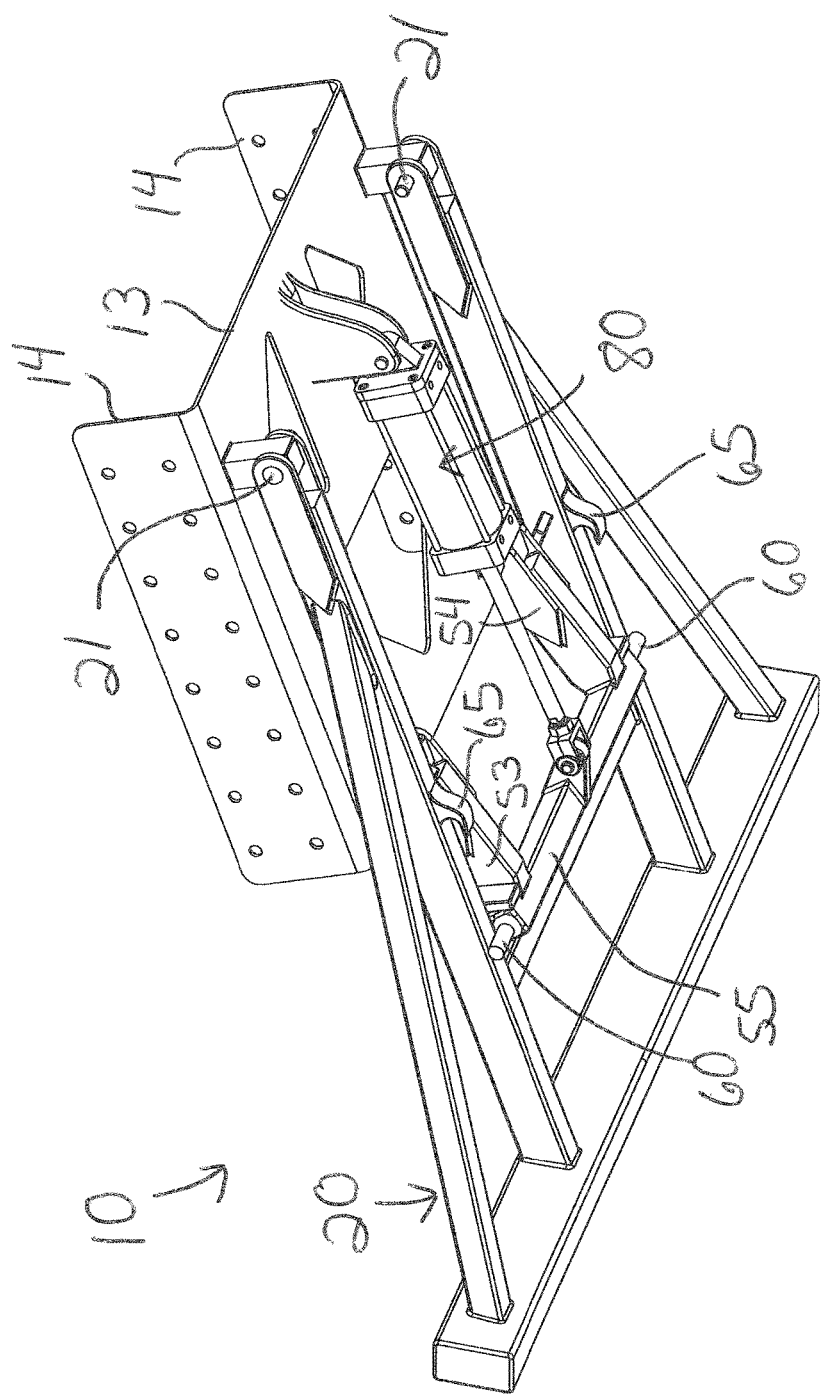
FIG. 5 is a right-bottom perspective view of the under-guard of FIG. 1 in the retracted position.
Figure 6:
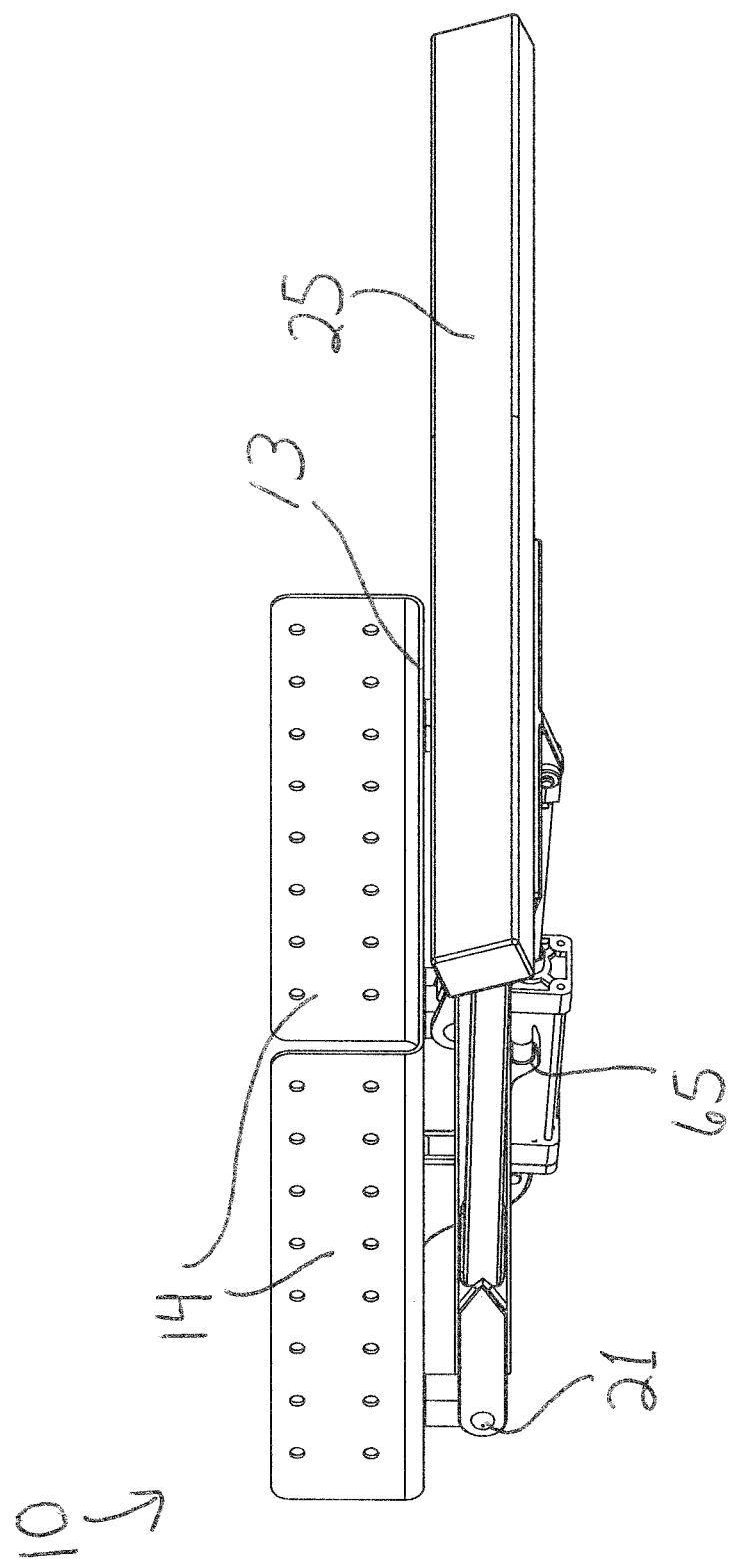
FIG. 6 is a rear perspective view of the under-guard of FIG. 1 in the retracted position.

The guard frame 20 may be described as a generally triangular frame in a top or bottom view, as illustrated in FIG. 4, as the front pivot points 21 are at/on the fairly narrow-width wrap unit 12, and yet the main guard bar 25 is wide enough to stop or "catch" a vehicle colliding with the truck from any angle/location at the rear of the truck. The connections, materials, and structure of the guard frame 20 will be suitable for "catching" a colliding vehicle to prevent it from underriding the truck (becoming wedged/smashed under the vehicle) and/or to provide energy absorption/deflection. For example, the under-guard may comprise collapsing and/or other force-dissipating and cushioning features in certain embodiments, for example, as shown in the under-guard 100 of FIGS. 18-26. Certain embodiments may also or instead comprise adaptations so that no bar or other portion of the under-guard is likely to break and stab into the colliding vehicle.

It may be noted that the preferred guard frame 20 has only front pivotal connections (pivot points 21) to the wrap unit 12 or other connector, and so can swing freely relative to the wrap unit 12 except as controlled/managed by the actuator frame 50. While the guard frame 20 tends to swing down by the force of gravity, the actuator frame 50 has a rear end configured to lie under the guard frame 20 and control the position of the frame 20 by the actuated movement of the actuator frame 50. Said actuation of the actuator frame 50, and hence of the guard frame 20, may be done hydraulically, pneumatically, electrically, or by other means, as will be understood by one of average skill in this field after reading this document and viewing the Figures.

Figure 7:
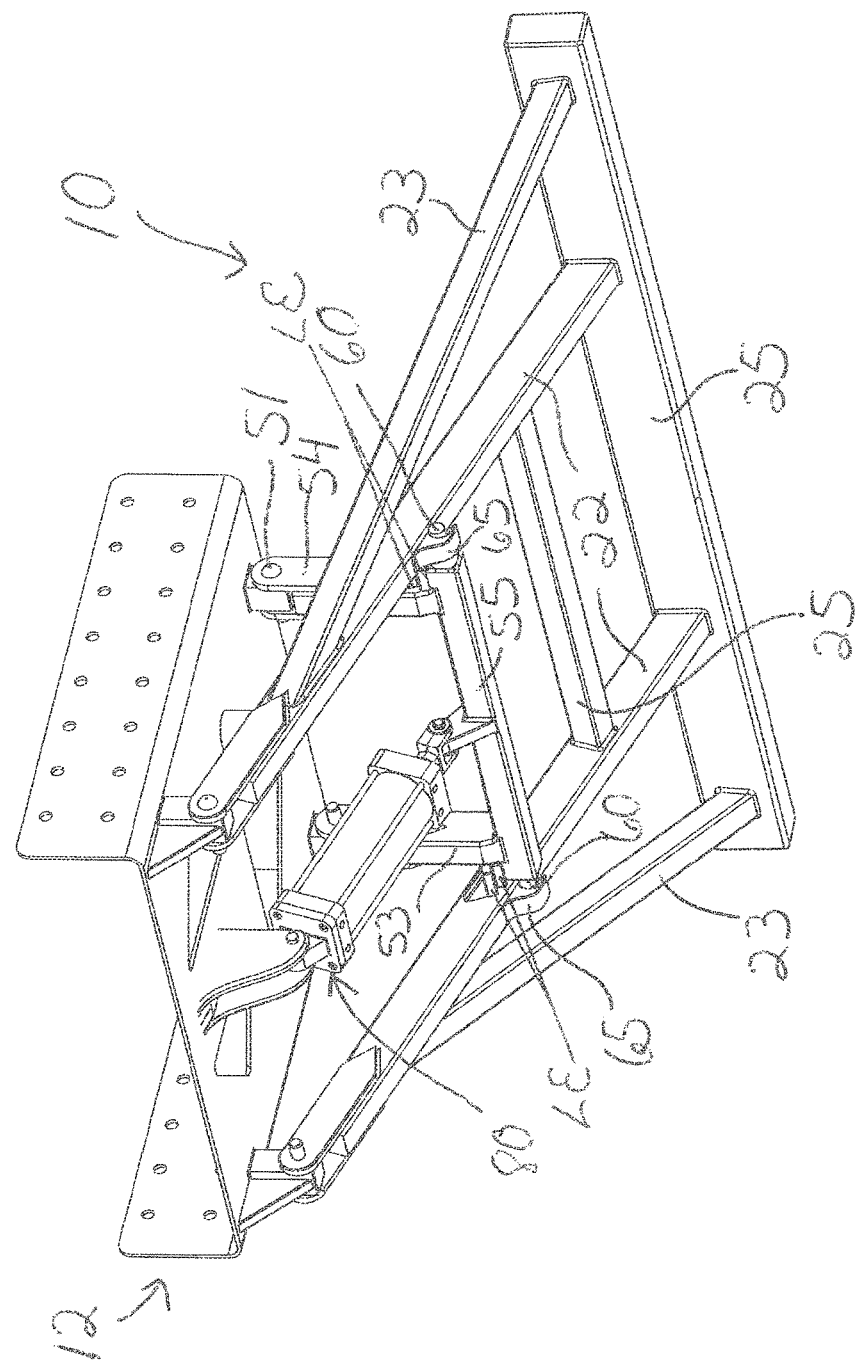
FIG. 7 is a left-bottom perspective view of the under-guard of FIG. 1 now in the deployed position.

The actuator frame 50 is a generally planar frame structure, as may be seen to best advantage in FIG. 7, wherein the plane (or "central plane") of actuator frame 50 is horizontal or generally horizontal, for example, 0 to 5 degrees, and more preferably 0 to 3 degrees, from horizontal, in the retracted position (FIG. 1, somewhat hidden inside the guard frame 20) and vertical or generally vertical in the deployed position (FIG. 7, extending from the wrap unit 12 to the guard frame 20). The actuator frame 50 is pivotally connected to the wrap unit 10 at rear pivot points 51. Actuator frame 50 is a generally rectangular U-shaped frame comprising parallel right and left bars 53, 54 pivotally connected to the wrap unit 12 at pivot points 51, and cross-bar 55 extending horizontally between right and left bars 53, 54 at or near the guard frame 20. The cross-bar 55 comprises rigid extensions to the right and left, which may be called "pins 60" that extend and underneath portions of the guard frame 20, being configured to support bars 22, and slide longitudinally along the underside lengths of bars 22 during movement of the actuator frame 50 relative to the guard frame 20.

Actuator 80 extends longitudinally relative to the guard frame 20 and the vehicle. The rear end of actuator 80 is pivotally connected to the cross-bar 55, and the front end of actuator 80 is pivotally connected to the horizontal main body/plate of the wrap unit 12. In the retracted position shown in FIGS. 1-6, the actuator frame 50, and particularly its pins 60, are supporting, and therefore retaining, the guard frame 20 in its fully-raised position due to the exemplary hydraulic cylinder of the actuator 80 being extended/lengthened. From the retracted position of FIGS. 1-6, shortening the hydraulic cylinder of actuator 80 causes the cylinder to pull the actuator frame 50 to pivot forward/downward. This lowers the cross-bar 55 and its pins 60, which allows the guard frame 20 to pivot forward/downward due to the force of gravity. During this lowering of the guard frame 20, the pins 60 slide forward along the underside of guard frame 20, with the sliding position of the pins controlling the speed and amount of lowering of the guard frame 20 to the deployed position of FIGS. 7-13.

From the deployed position in FIGS. 7-13, the reverse may be done to retract the under-guard back to the position of FIGS. 1-6. Lengthening (extending) the cylinder of actuator 80 causes the rear end of the actuator 80 to push the actuator frame 50 to pivot rearward, which raises the cross-bar 55 and its pins 60 to a higher level. Said raising of cross-bar 55 and pins 60 causes the guard frame 20 to pivot upward, raising the guard frame. If raised to the full extent, the guard frame reaches the retracted, or "fully-raised" position, of FIGS. 1-6.

It will be understood that the length of the cylinder, for example as it moves between its shortened and lengthened positions, controls the amount of pivoting of the actuator frame 50, and, hence, the raising and lowering of the guard frame 20. One of skill in the art, after reading this disclosure and seeing the figures, will be able to design/select the pneumatic or hydraulic cylinder, or other actuator, and the dimensions and positions of the actuator 80 and actuator frame 50, relative to each other and to the wrap unit 12 and guard frame 20. A single actuator 80 is preferred, but multiple actuators may be used in certain embodiments.

One may see from the Figures that the preferred guard frame 20 is never near vertical or entirely vertical. Instead, the guard frame 20 (for example, central plane CP) is either horizontal or generally horizontal, for example, 0 to 5 degrees, and more preferably 0 to 3 degrees, from horizontal) in the retracted position. Also, the deployed guard frame 20 central plane CP extends, for example, in the range of about 25-70 degrees, more preferably in a range of 15-45 degrees, or more preferably in a range of 15-25 degrees from horizontal (see FIG. 9). Note that the main guard bar 25 is generally rectangular and has a rear face that is at an angle to the central plane of the guard frame 20, so that the bar 25 rear face is preferably vertical when deployed.

When the guard frame is in the lowered, deployed position, multiple lock systems retain the guard frame in proper position in the event of a rear collision with the under-guard (from generally behind the truck, against the rear, right-rear, or left-rear of the guard frame), and preferably also in the event of a front collision or impact with obstacles (against the front, right-front, or left-rear of the under-guard). These multiple lock systems include, preferably on each of the right and the left sides of the under-guard: 1) a pin-and-hook system; and 2) a slanted plate system.

The pin-and-hook system, also called by the inventor(s) a "locking dog" system, comprises at least one pin 60 on the actuating frame 50 that, for deployment and retraction, moves into and out of the at least one rearward-facing rigid hook 65 that is fixed to the guard frame 20. When the actuator system 50 retracts the pin 60 to its forward-most position to deploy the guard frame 20, the pin 60 is captured between the hook 65 and a beam 22 of the guard frame 20. While being adapted to serve a locking function, this pin-and-hook system does not interfere with deployment or retraction of the under-guard, in fact, it is part of the structure that affects said deployment and retraction.

Upon collision against the guard frame 20, the following forces/actions take place:

A) A forward-directed force on the guard frame, for example a car at the rear of the truck impacting main guard bar 25, forces the guard frame 20 and particularly bar 22 forward against the pins 60 of the actuator frame. In the deployed position, the cylinder of actuator 80 may be in its fully-contracted condition, and such an impact may not cause further contraction of the cylinder or further forward pivoting of the actuator frame. In the deployed position, such an impact may not involve the hooks 65 of the guard 20, as the hooks 65 are in front of the pins 60.

B) A rearward-directed force on the guard frame, for example by the truck forward rolling over an obstacle when the under-guard is deployed, may force the guard frame 20 and hence the hooks 65 rearward against the pins 60 of the actuator frame. In the deployed condition, such a rearward force on the guard frame 20 may cause, via the hook 65 pulling the pins 60 rearward, the cylinder to slightly lengthen, which could supply a bit of relief buy allowing some movement of the guard frame 20 to potentially avoid damage to the under-guard and/or the truck.

Both of actions A and B above retain the guard frame in its deployed condition or generally in its deployed condition. In other words, the actions of A and B may be described as resulting from at least one portion of the guard frame (for example, hooks 65) extending in front of the stationary or substantially-stationary actuator pins 60, and at least one portion of the guard frame (for example, beams 22) extending in back of the stationary or substantially-stationary actuator pins 60, thus providing front and back limits/stops to prevent or at least limit guard frame movement relative to the actuator frame.

The slanted plate lock system mentioned above, also called an "impact wedge" or "stop plate" system by the inventor(s), includes a slanted plate of the guard frame that rests on a slanted plate of the actuating frame when the under-guard is in the deployed position. This plate lock system supplements the hook-and-pin lock system, to retain the deployed guard frame 20 in proper operative position, in the event of a forward-directed collision/impact (from generally behind the truck, against the rear, right-rear, or left-rear of the guard frame) while also not interfering with deployment or retraction of the under-guard.

The plate lock system comprises a set 70 of two cooperating plates, preferably on each of the right and left sides of the under-guard (FIGS. 8, 11-13). Each set 70 is made of a rigid plate 71 rigidly fixed to the guard frame and a rigid plate 72 rigidly fixed to the actuator frame (FIGS. 4, 4A). Each of the plates is slanted relative to the main plane of its respective frame, resulting in each of the plates being slanted relative to horizontal when the under-guard is deployed, for example, being about 40-50 degrees, and preferably about 45 degrees, relative to the ground and the stationary truck frame (and, hence, typically also at that range/degrees relative to horizontal). Each of the plates is slanted so that its top/upper edge is rearward of its bottom/lower edge.

Figure 8:
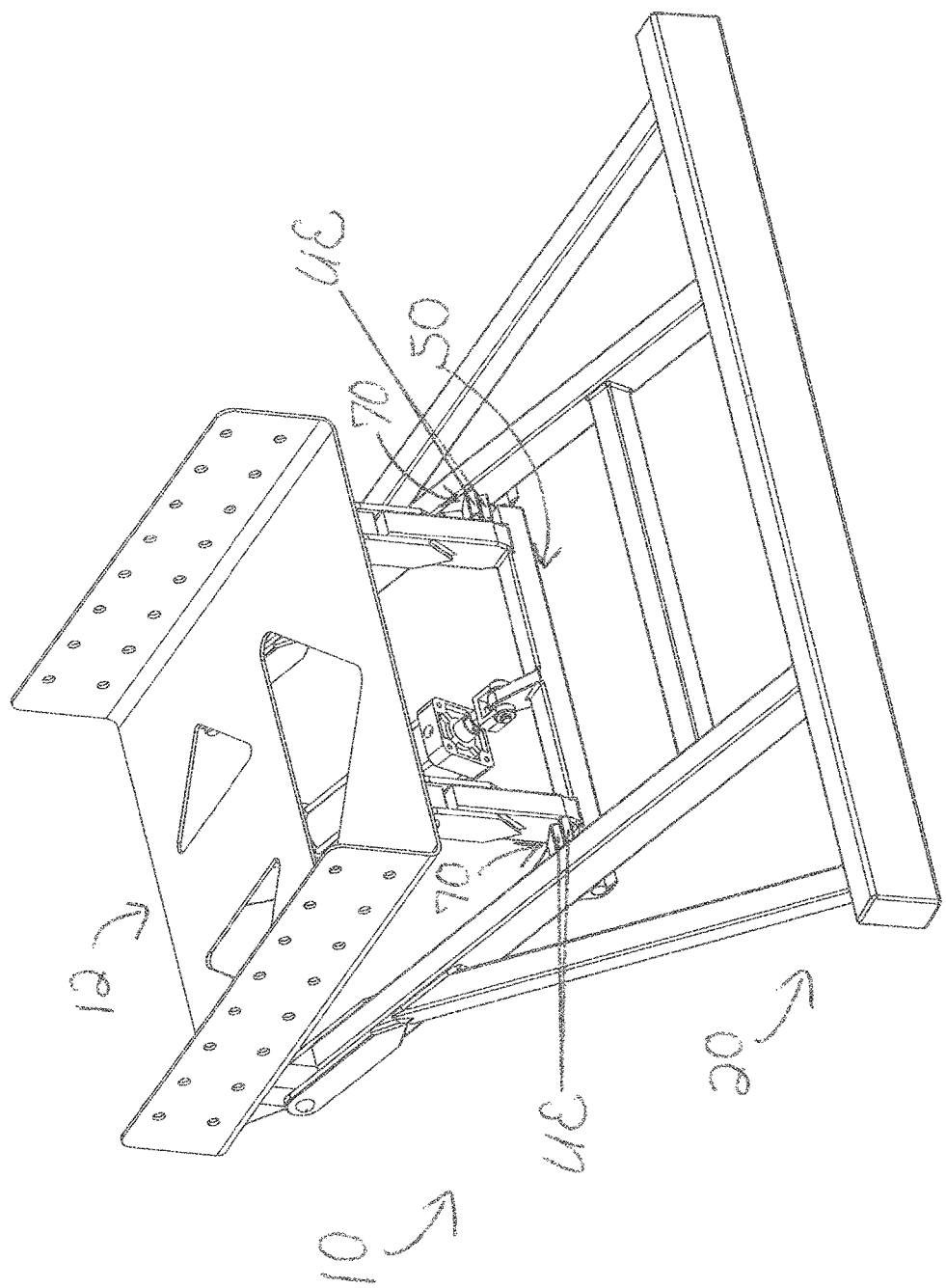
FIG. 8 is a top-rear perspective view of the under-guard of FIG. 1 in the deployed position.
Figure 11:
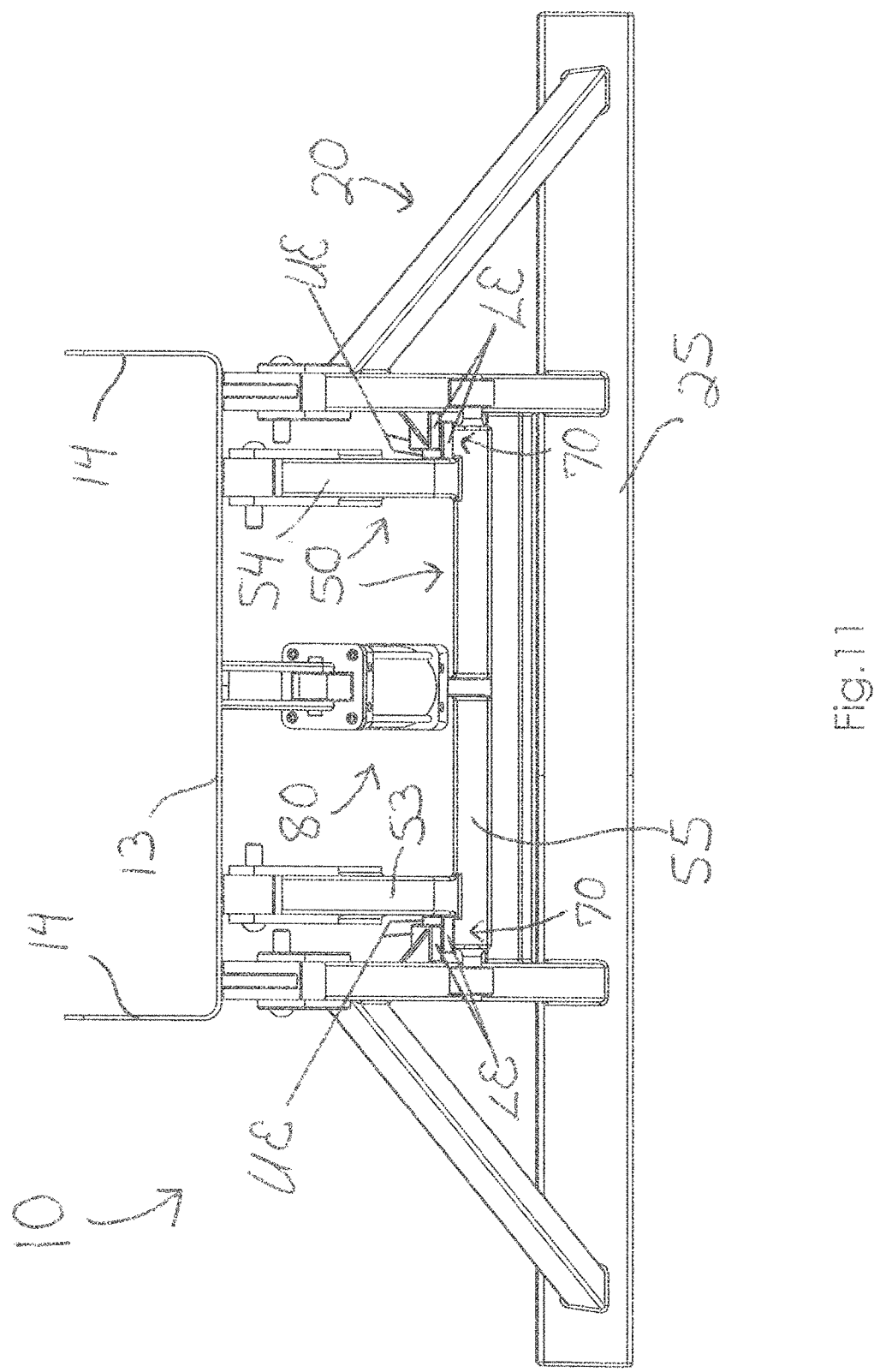
FIG. 11 is a front view of the under-guard of FIG. 1 in the deployed position.
Figure 12:
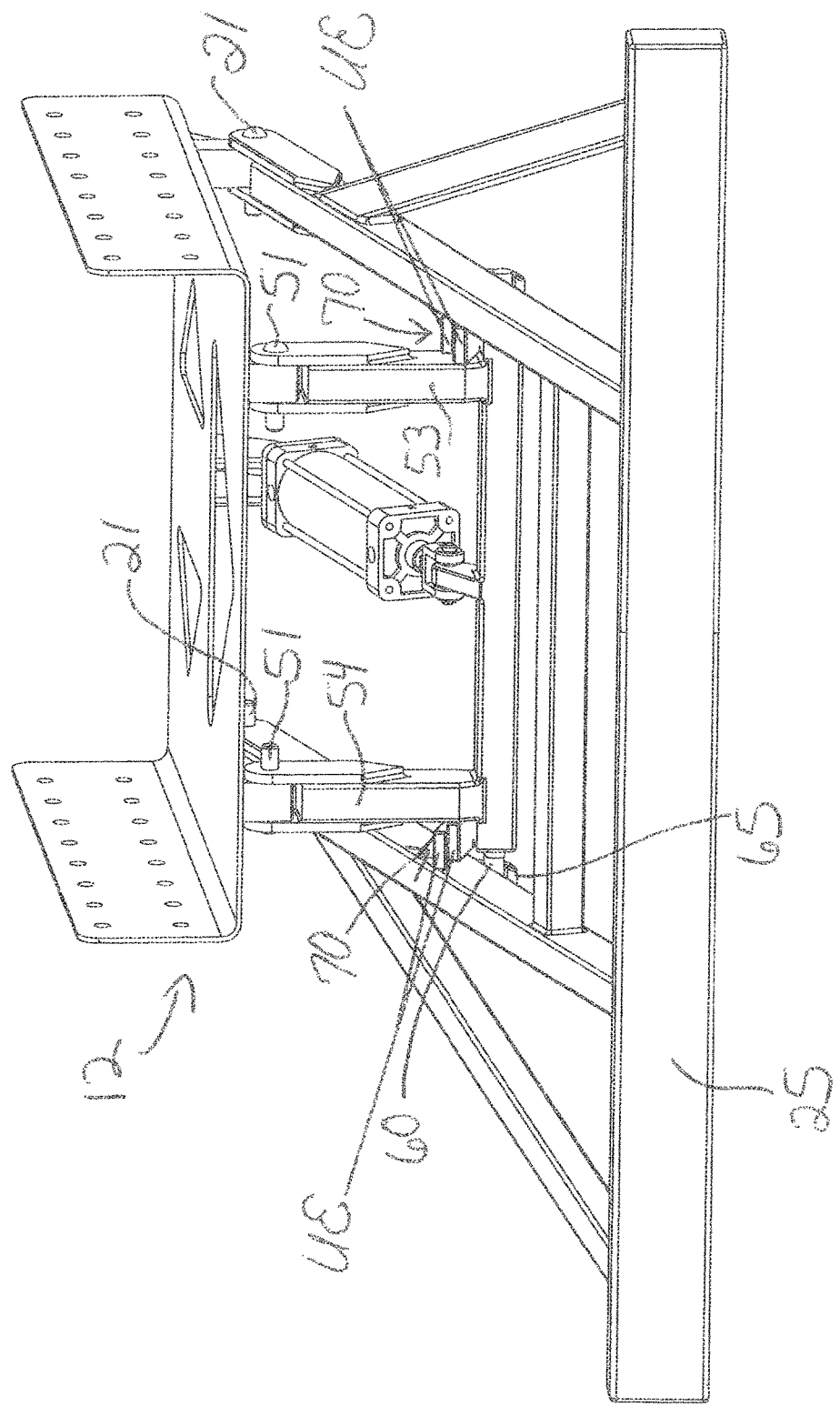
FIG. 12 is a rear perspective view of the under-guard of FIG. 1 in the deployed position.
Figure 13:
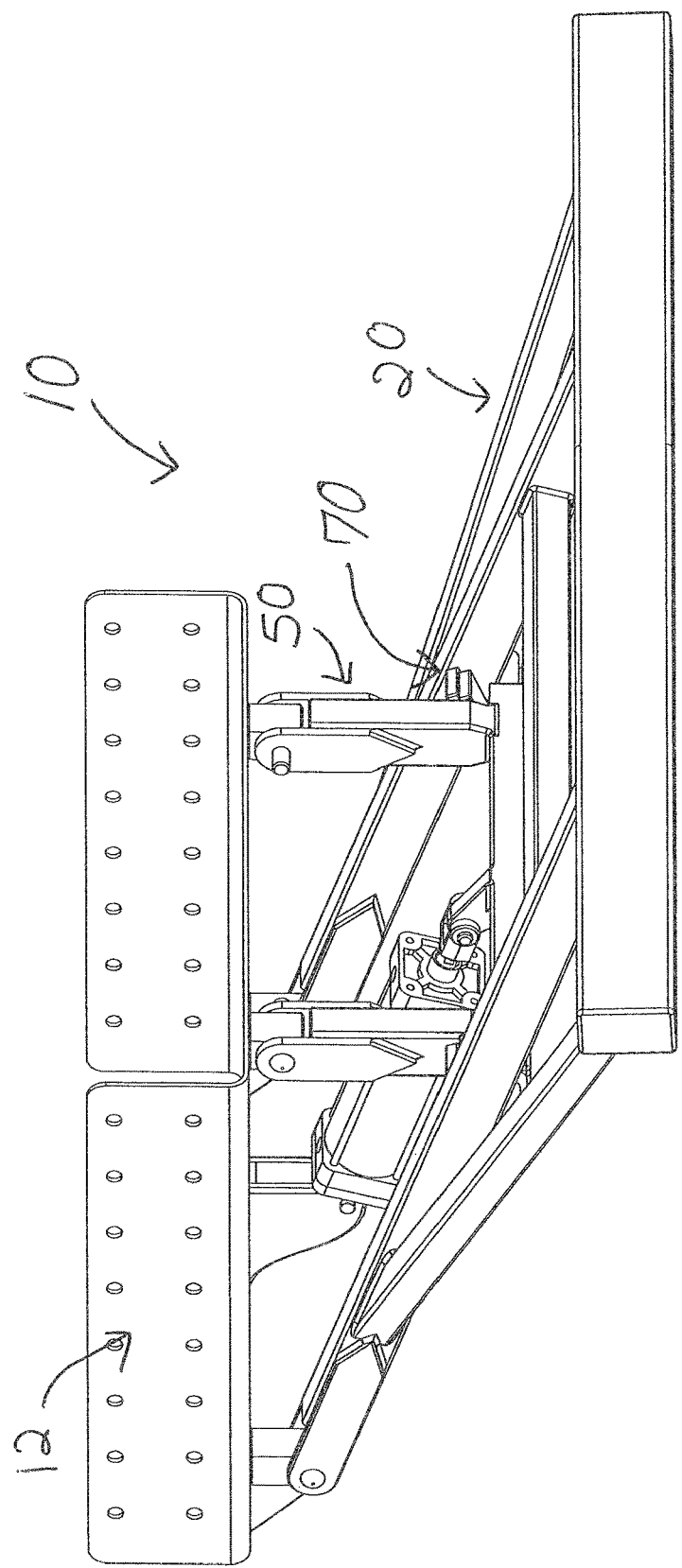
FIG. 13 is a left-rear perspective view of the under-guard of FIG. 1 in the deployed position.

During normal movement of the under-guard system from the retracted position wherein the plates 71, 72 are separated (see FIGS. 4 and 4A), to the deployed position, the plates move to positions that are near to or touching each other and preferably parallel to each other (FIGS. 8, 11, and 12). This movement comprises relative movement of the guard frame plate 71 and the actuator plate 72, specifically, plate 72 being swung (by pivoting of actuator frame 50) down and under the guard frame plate 71, which plate 71 is also being swung downward (by pivoting of the guard frame 20). The result of this relative movement is that both plates 71, 72 in their deployed condition are in positions that are forward and lower relative to their retracted positions, and both plates are in the range of about 40-50 degrees, and preferably about 45 degrees (42-48 degrees), relative to the ground/horizontal. Each plate 71, 72 has a relatively-large-surface-area, preferably planar plate surface or "stop surface" S facing and near/touching the planar plate surface or "stop surface" S of the other. Rigid plate 72 of the actuator frame may be described as a first plate having a stop surface S (FIG. 4A), and rigid plate 71 of the guard frame may be described as a second plate having a stop surface S (FIG. 4A), wherein, when the actuator frame is in the lowered position and the guard frame is in the deployed position, the first plate stop surface and the second plate stop surface are parallel and contacting each other, to further retrain the guard frame in the deployed position. The first plate stop surface (in the actuator-frame-lowered position) and said second plate stop surface (in the guard-frame-deployed position) are preferably at a slanted angle relative to horizontal and each of the first plate and the second plate has a lower edge LE (FIGS. 7 and 11), and an upper edge UE (FIGS. 8, 11, and 12) that is rearward of the lower edge. The slanted angle is preferably in the range of 40-50 degrees.

In the guard-deployed position, therefore, the guard frame plate 71 rests generally on top of and forward of the actuator frame plate 72, with both plates being in the above-mentioned preferred range of 40-50 degrees relative to the ground/horizontal. Then, during normal movement of the under-guard system to the retracted position, the plates move away from each other without interfering with the retraction of the guard frame. This "moving away each other" comprises the actuator frame plate 72, in effect, being swung rearward and out-from-under guard frame plate 71 by the movement of the actuator frame 50, while the guard frame plate 72 is swung up and rearward (but not as far rearward as plate 71) by the pivoting of the guard frame 20 to the retracted position. In the retracted position, the two plates 71, 72 are at least several inches away, for example, 0.5 up to 1.5 feet away from each other depending on the size of the under-guard and the relative lengths of the guard arm 20 and the actuator arm 50. Upon collision, a forward-directed force on the guard frame, for example a car impacting the rear of the truck and hitting the main guard bar 25 from the rear, right-rear, or left-rear, will apply force that would tend to pivot the guard frame downward to an undesirable position, were it not for the guard frame plate 71 abutting downward against the actuator frame plate 72. In other words, the guard frame plate 71 cannot pivot downward, or at least cannot pivot any significant amount downward, as it is limited/prevented from such pivoting by the actuator frame plate 72 that is held in place by the actuator frame 50 by means of the retracted cylinder 80; therefore, the guard frame itself is limited/prevented from pivoting downward from its deployed position.

As mentioned above, the preferred plates 71, 72 are installed/fixed to the guard frame 20 and actuator frame 50, respectively, so in the deployed position, they are preferably at about 45 degrees to the ground/truck-frame/horizontal. And, although the inventor believes that 45 degrees is the optimum angle for installation of the plates 71, 72, the plate angle could potentially be changed, in certain embodiments, for example, if the relative length of the beam/arms/bars of the under-guard were to change and/or the deployed angle of the guard frame were to change. In any event, however, it is desirable that the angles of the plates 71, 72 relative to the main planes of their respective guard frame and actuator frame, and the resulting angles to horizontal when the guard frame is deployed, be such that the plates 71, 72 mate upon deployment to resist further downward pivoting of the guard frame 20, while not interfering with retraction of actuator frame and guard frame. After reading this document and viewing the Figure, one of average skill in this field will understand how to adjust said angle(s) for variously-sized and deployment-angle under-guards.

In the event of a rearward-directed force, which is more rare and not the primary concern for an under-guard, the rearward force on the under-guard will tend to not be restrained or resisted by the sets 70 of plates 71, 72, but, as described above, the pin-and-hook system will tend to restrain the guard frame in the deployed position by resisting a rearward-directed force on the guard frame.

Figure 14:
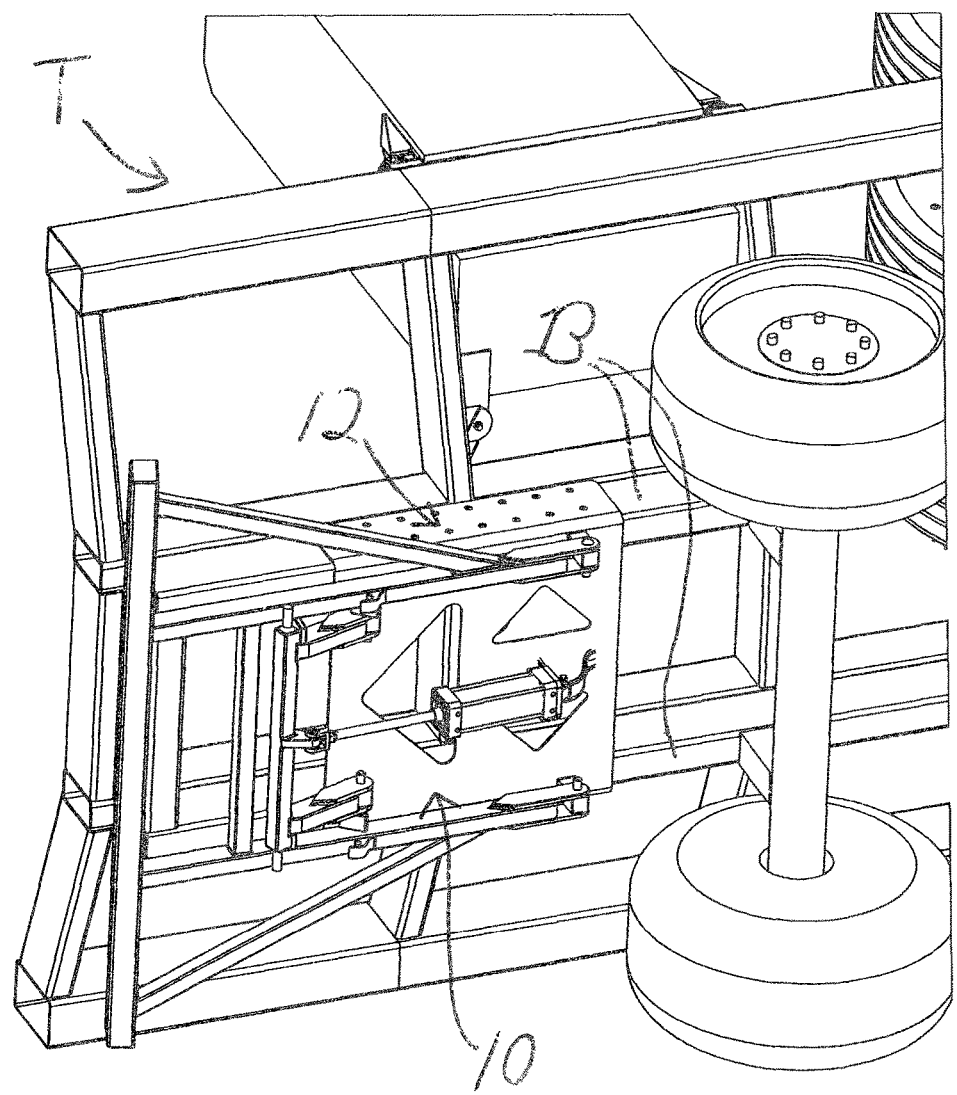
FIG. 14 is a bottom perspective view of the under-guard of FIG. 1 installed at the back of an exemplary truck and in the retracted position.
Figure 15:
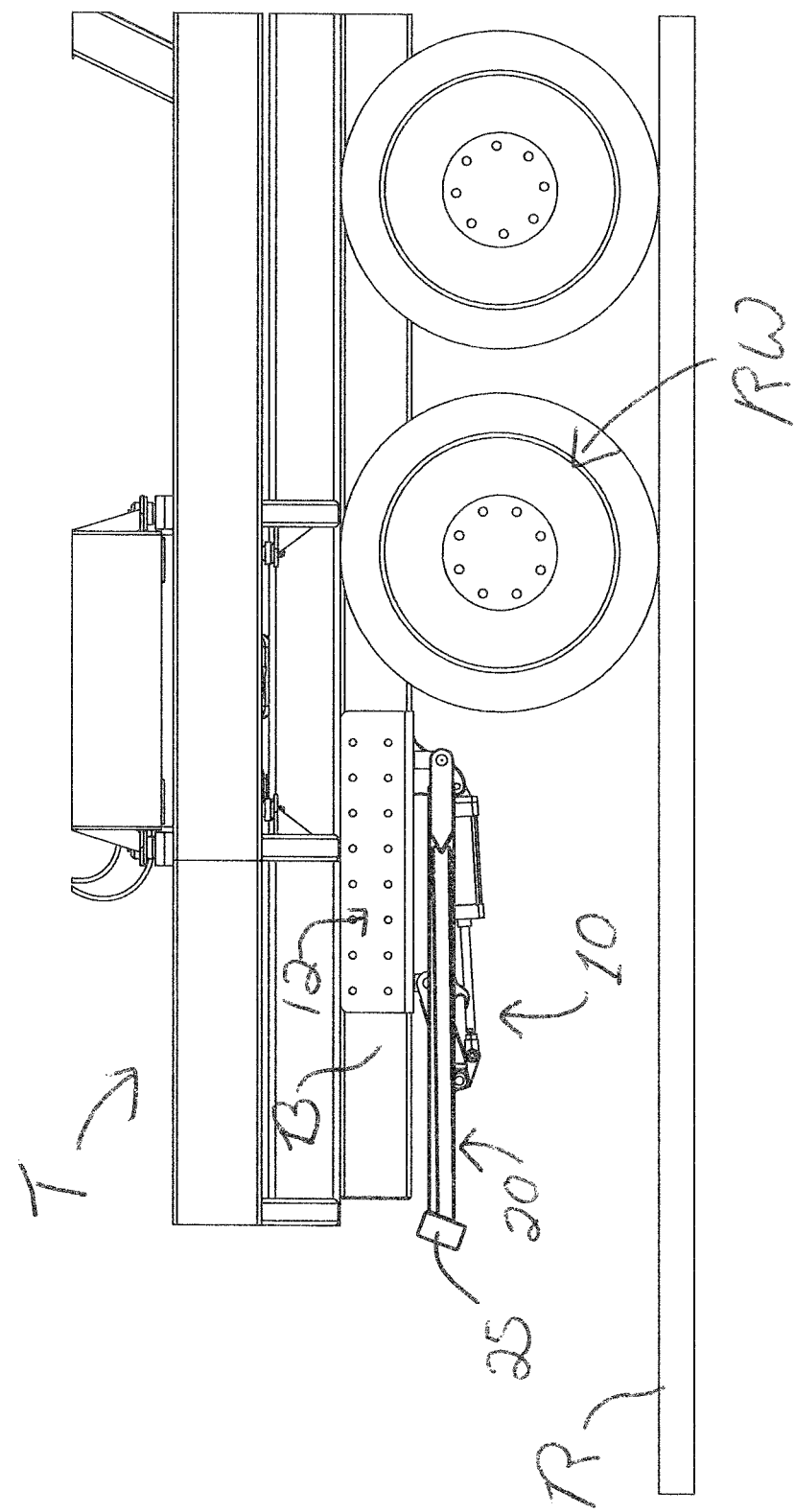
FIG. 15 is a right side view of the retracted under-guard and vehicle of FIG. 14.

FIGS. 14-17 illustrate under-guard 10 installed on an exemplary truck T, mainly for collisions at the rear, left-rear, and right-rear of the truck. FIGS. 14 and 15 shown the under-guard 10 in the retracted position. FIG. 15 illustrates to best advantage that the retracted under-guard 10 has a very thin profile, from top to bottom. FIG. 15 also illustrates that the under-guard 10 frame wrap unit 12 is connected to a beam(s) B behind the rearmost wheels RW, and the guard frame 20 extends rearward to place the main guard bar 25 preferably at or near the rear extremity of the truck outer perimeter; this results in the under-guard 10 being out of the way during off-road use, so that there is clearance for travel over and near obstacles, and so that no part of the under-guard 10 extends out a significant distance past the outer perimeter of the truck T. For example, the under-guard 10 extends less than 1 foot, and preferably less than 0.5 foot, out past the outer perimeter of the truck T.

Figure 16:
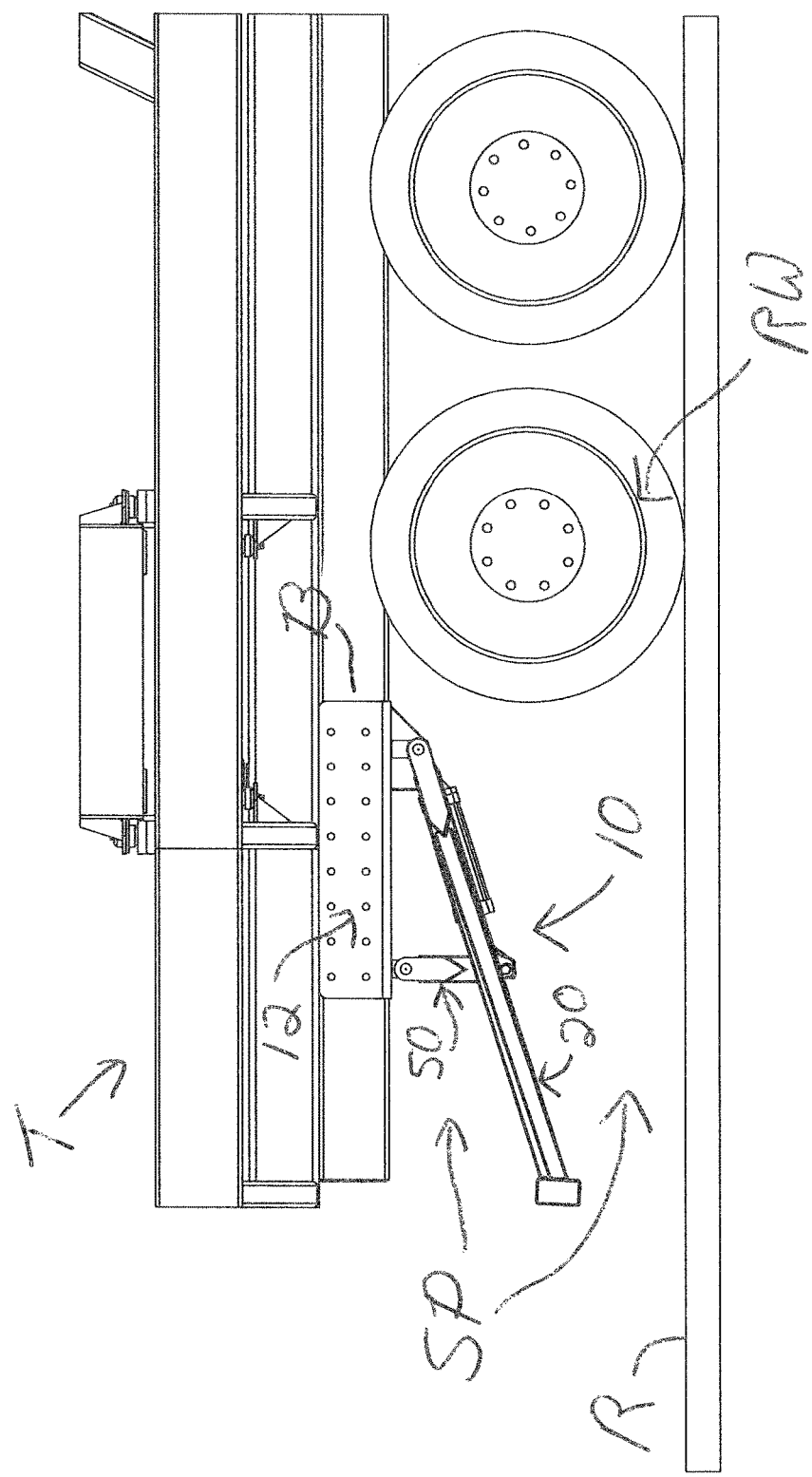
FIG. 16 is a right side view of the under-guard and vehicle of FIG. 14, wherein the under-guard is deployed.
Figure 17:
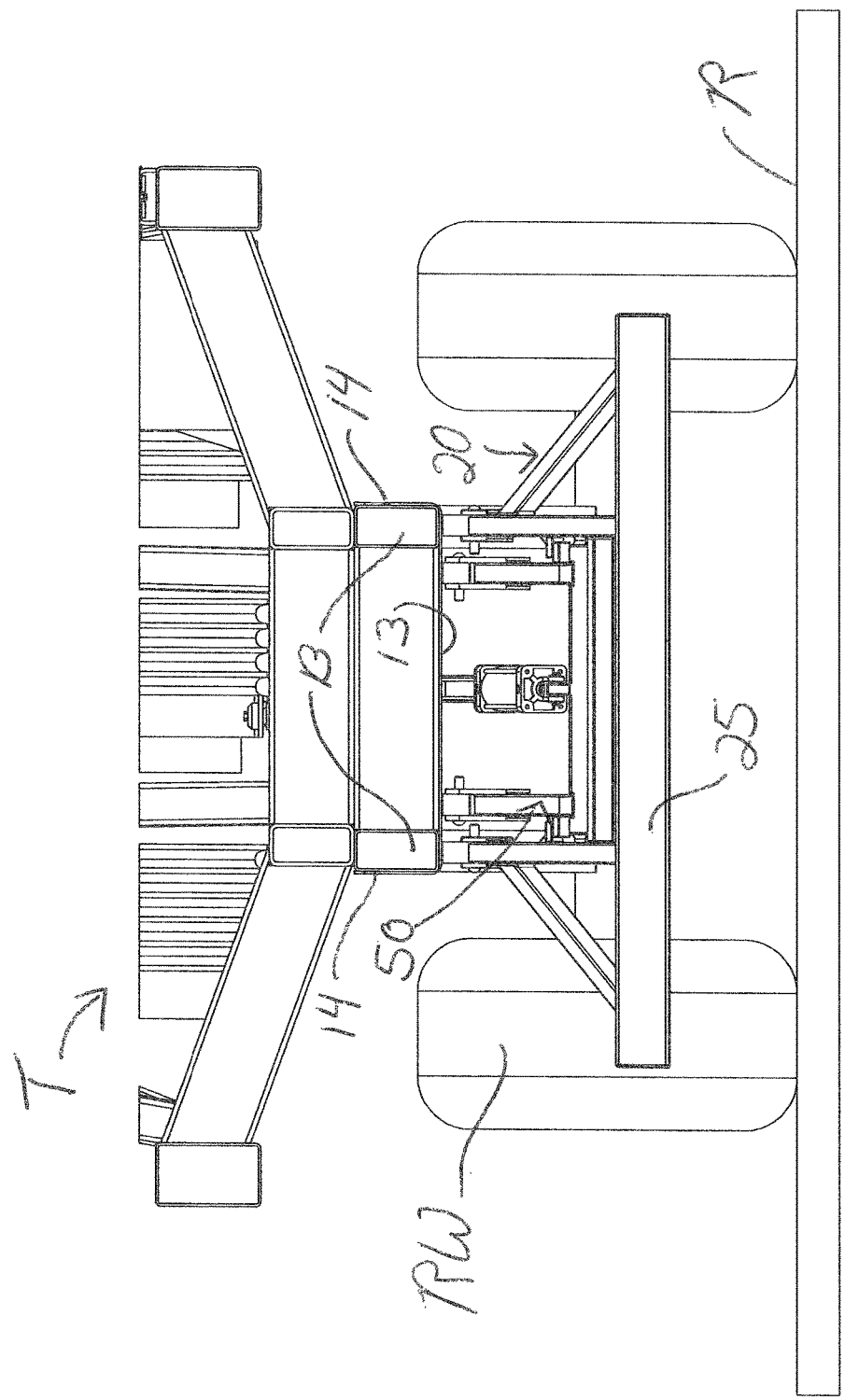
FIG. 17 is a rear view of the deployed under-guard and vehicle of FIG. 17.

FIGS. 16 and 17 illustrate the under-guard 10 in deployed position, where it may be seen that the guard frame extends to place the main guard bar 25 about midway between the truck T underside (for example, beams B), and the road R. More specifically, the under-guard 10 will be designed and sized so that the deployed main guard bar 25 for a particular truck T will be at the legal height relative to the road R and the truck/trailer bed when deployed, which is deemed to be the position that effectively "catches" automobiles to prevent underride underneath the truck T into space SP. Under-guard 10, as described and drawn herein and at the guard frame deployment angle in a range of 15-25 degrees from horizontal, has been found to be universal for many trucks.

In the event of a rearward-directed force, which is rarer and not the primary concern for an under-guard, the rearward force on the under-guard will tend to not be restrained or resisted by the sets 70 of plates 71, 72.

Certain embodiments may be described as, or have the features from, one or more of the following list:

1) A rear underride guard (or "under-guard") being mounted to the vehicle frame in order to provide energy absorption/deflection and to prevent a vehicle aft and lower to the ground from travelling underneath the larger truck or trailer in the event of a collision.
2) An underride guard being pneumatically deployable to be retracted for off-road use and lowered for on-road travel.
3) An underride guard wherein the operator can manually control/deploy underride guard by way of a switch located in the cab of the vehicle.
4) An underride guard that may be electronically controlled to automatically retract when the vehicle is in reverse as well as deploy when the vehicle exceeds a certain MPH mark, for example, above 20 miles per hour. This feature may ensure, even if the driver/operator has not remembered to re-deploy the underride guard, that the underride guard is deployed to be in proper position very soon after the vehicle re-enters the road to travel at road/highway speeds. This feature, therefore, ensures that the underride guard is deployed when needed and legally considered essential.
5) An underride guard that fulfills a main purpose of providing rear impact protection in the event of a collision in compliance with existing Federal Motor Vehicle Safety Standards (FMVSS) and the National Highway Traffic Safety Administration's (NHSTA) pending proposed rulemaking.
6) An underride guard that provides protection without compromising functionality by allowing for off-road use with a reduced topographic threat of damage to vehicle and/or underride.

An alternative under-guard 100, shown in FIGS. 18-26, is built substantially the same as under-guard 10, and its construction, installation, and operation will be well understood from the above discussion of under-guard 10. However, to optimize certain operational features, under-guard 100 includes several improvements relative to under-guard 10, specifically, an improved rear main guard bar, improved connection of the rear main guard bar that comprises adaptation(s) for force absorption/dissipation, and reinforcement for the actuator frame.

Figure 18:
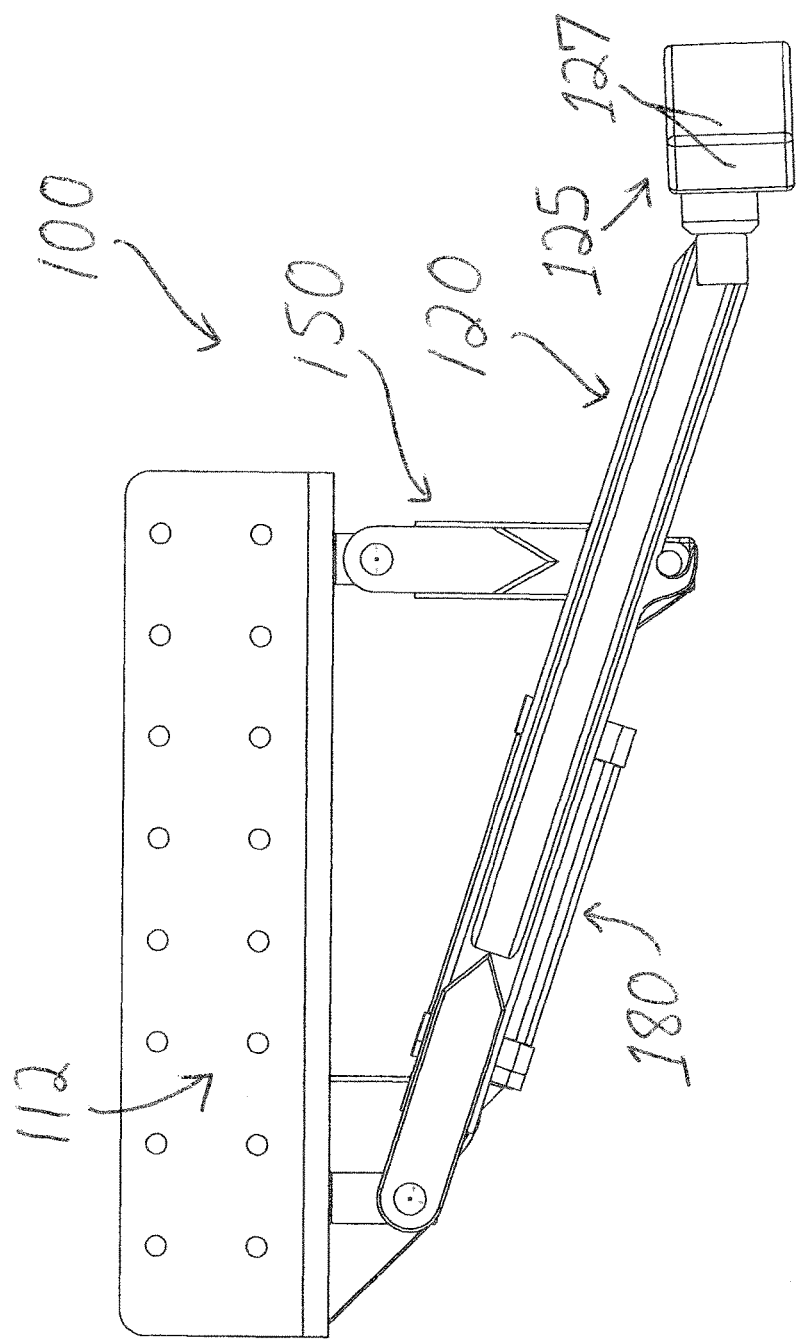
FIG. 18 is a top-rear perspective view of another embodiment of under-guard in the deployed position.
Figure 19:
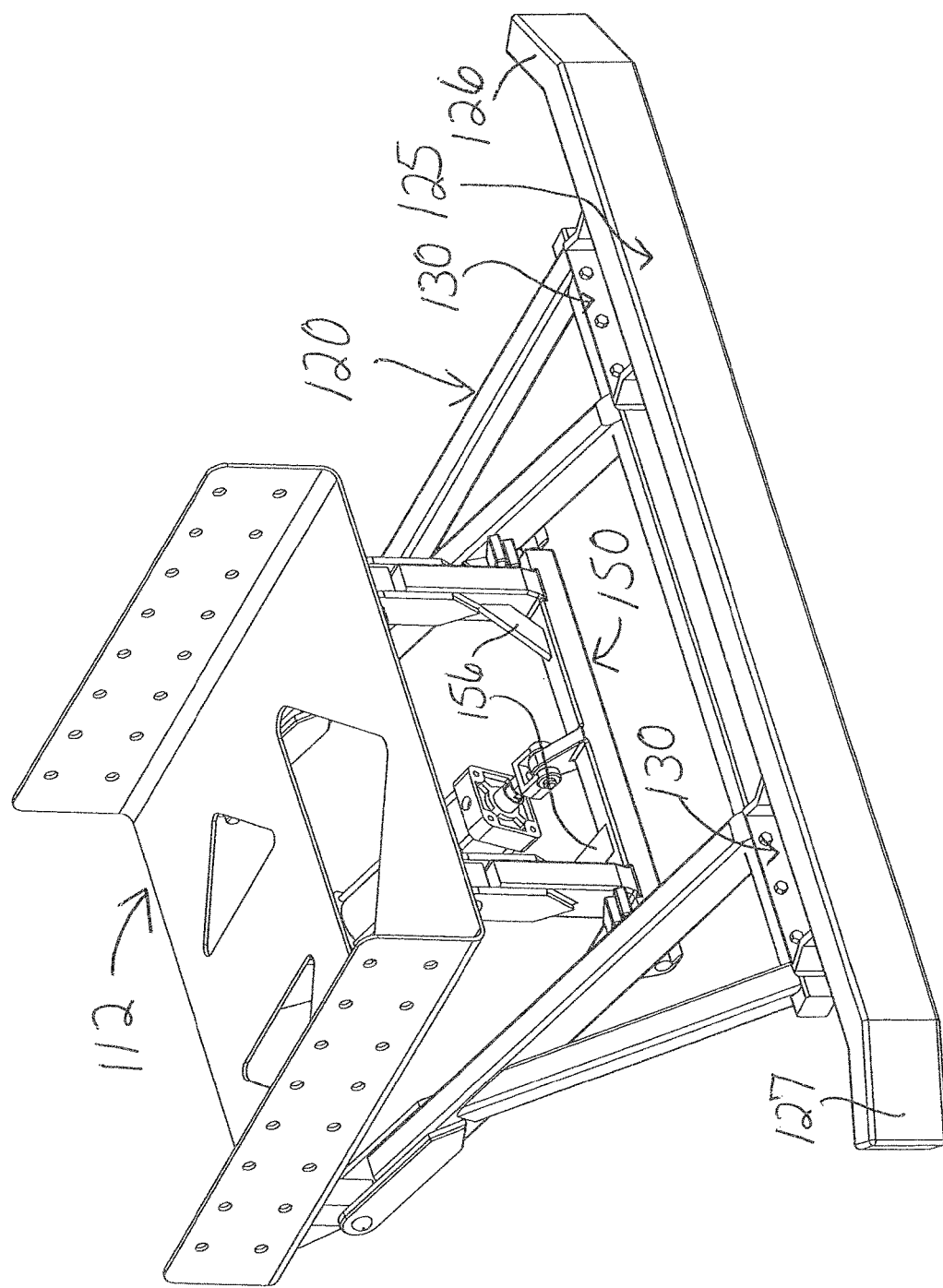
FIG. 19 is a left-side view of the under-guard of FIG. 18, in the deployed position.
Figure 20:
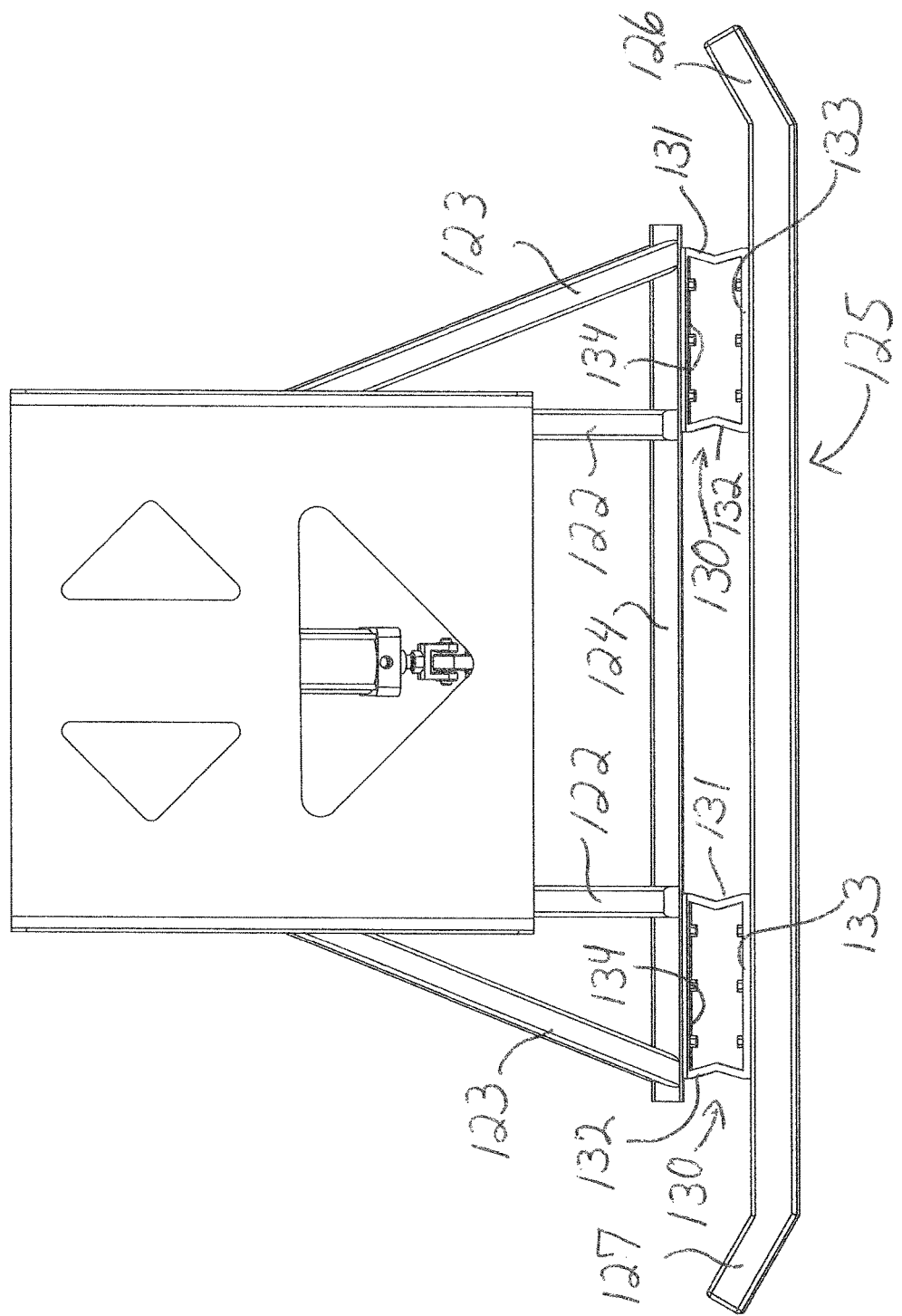
FIG. 20 is a top view of the under-guard of FIG. 18 in the deployed position.
Figure 21:
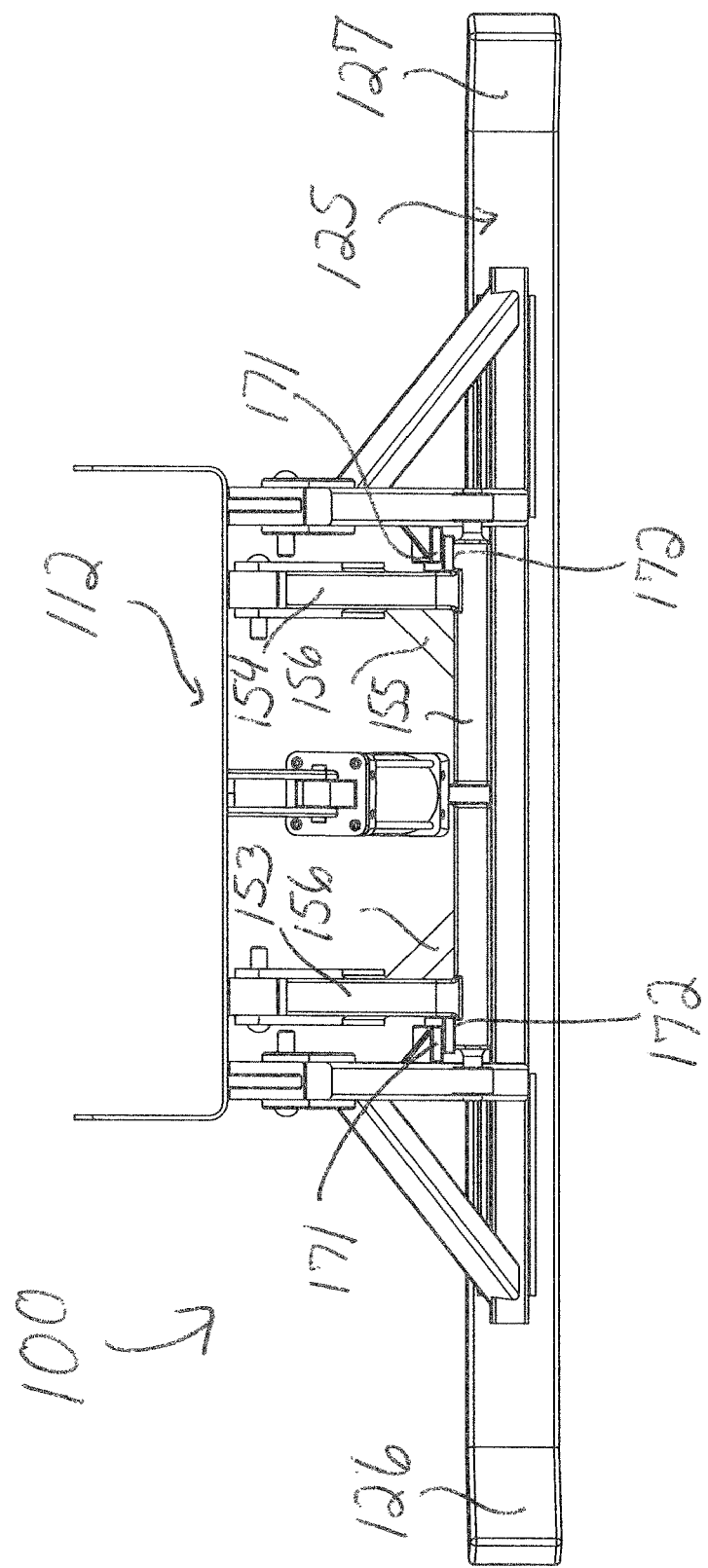
FIG. 21 is a rear view of the under-guard of FIG. 18 in the deployed position.
Figure 22:
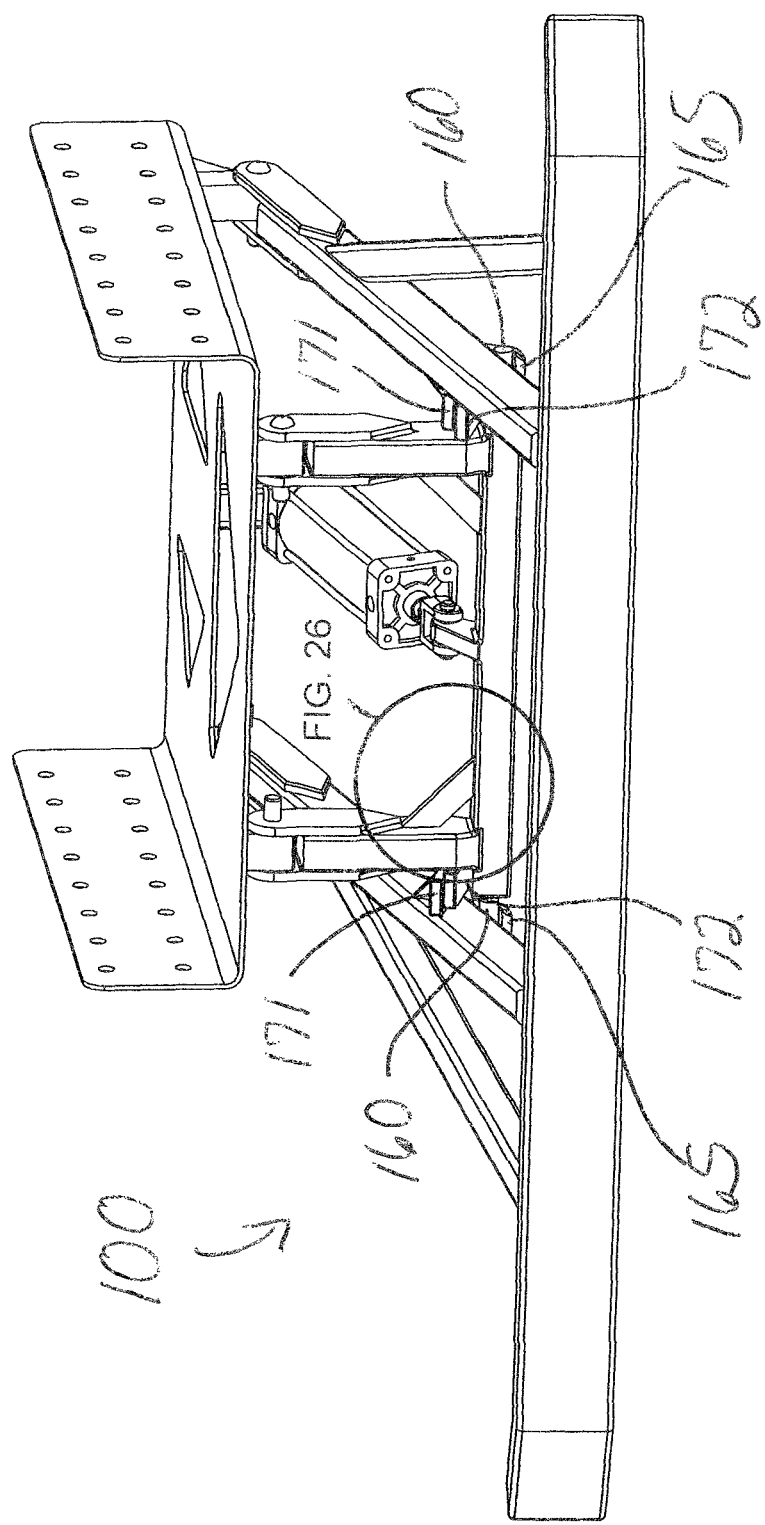
FIG. 22 is a rear perspective view of the under-guard of FIG. 18 in the deployed position.
Figure 23:
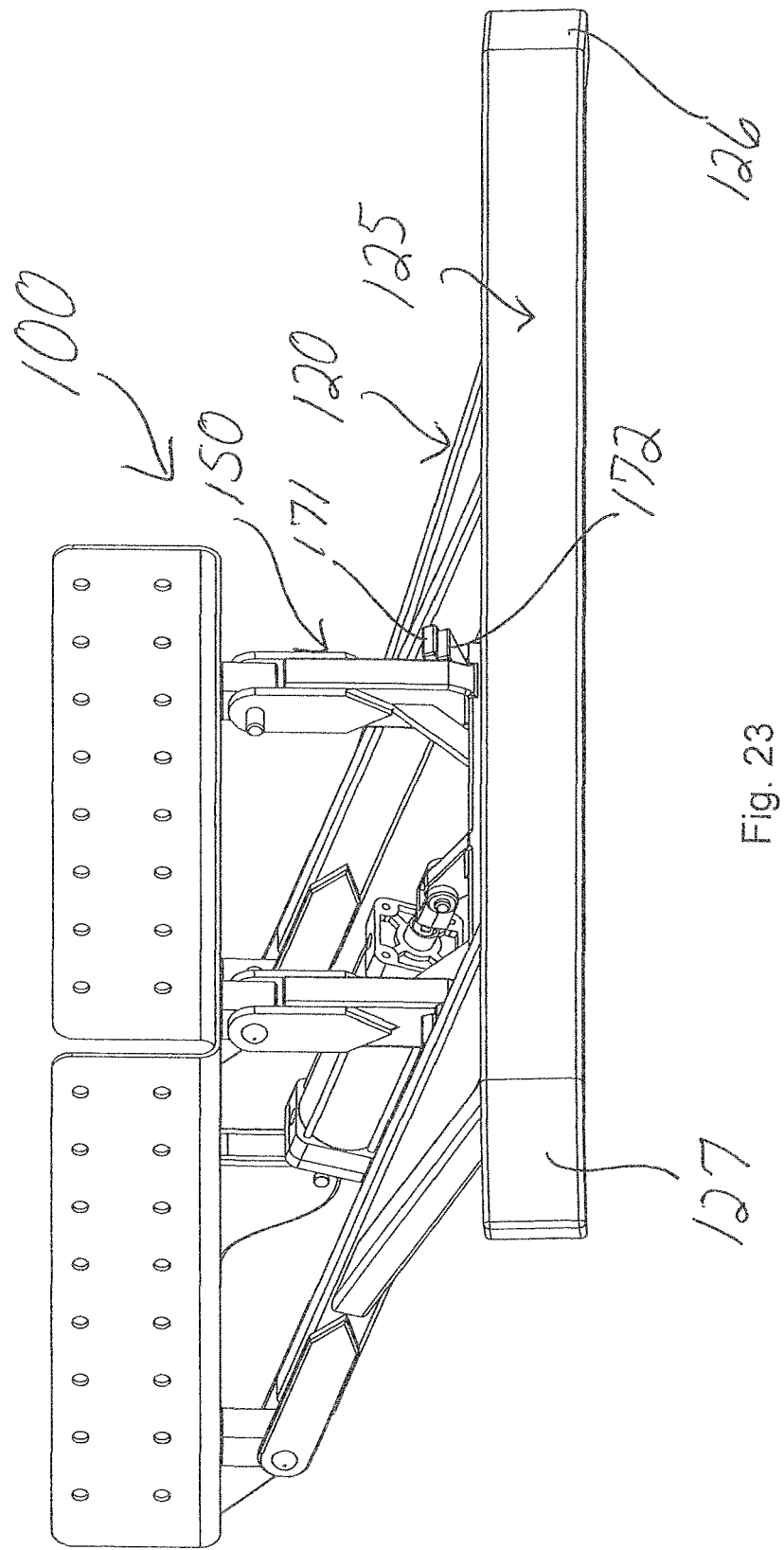
FIG. 23 is a left-rear perspective view of the under-guard of FIG. 18 in the deployed position.

FIGS. 18-22 illustrate under-guard 100, from various sides and perspectives, from which it may be seen that under-guard 100 is substantially the same as under-guard 10, but with certain improvements. FIG. 18 is a view of the alternative under-guard 100, which may be compared to FIG. 8 of under-guard 10. FIG. 19 is a view of the under-guard 100, which may be compared to FIG. 9 of under-guard 10. FIG. 20 is a view of the under-guard 100, which may be compared to FIG. 10 of under-guard 10. FIG. 21 is a view of the under-guard 100, which may be compared to FIG. 11 of under-guard 10. FIG. 22 is a view of the under-guard 100, which may be compared to FIG. 12 of under-guard 10. The frame wrap 112, the guard frame 120, the actuator frame 150, and actuator 180 may be formed and operate similarly as the corresponding structures of under-guard 10.

Figure 24:
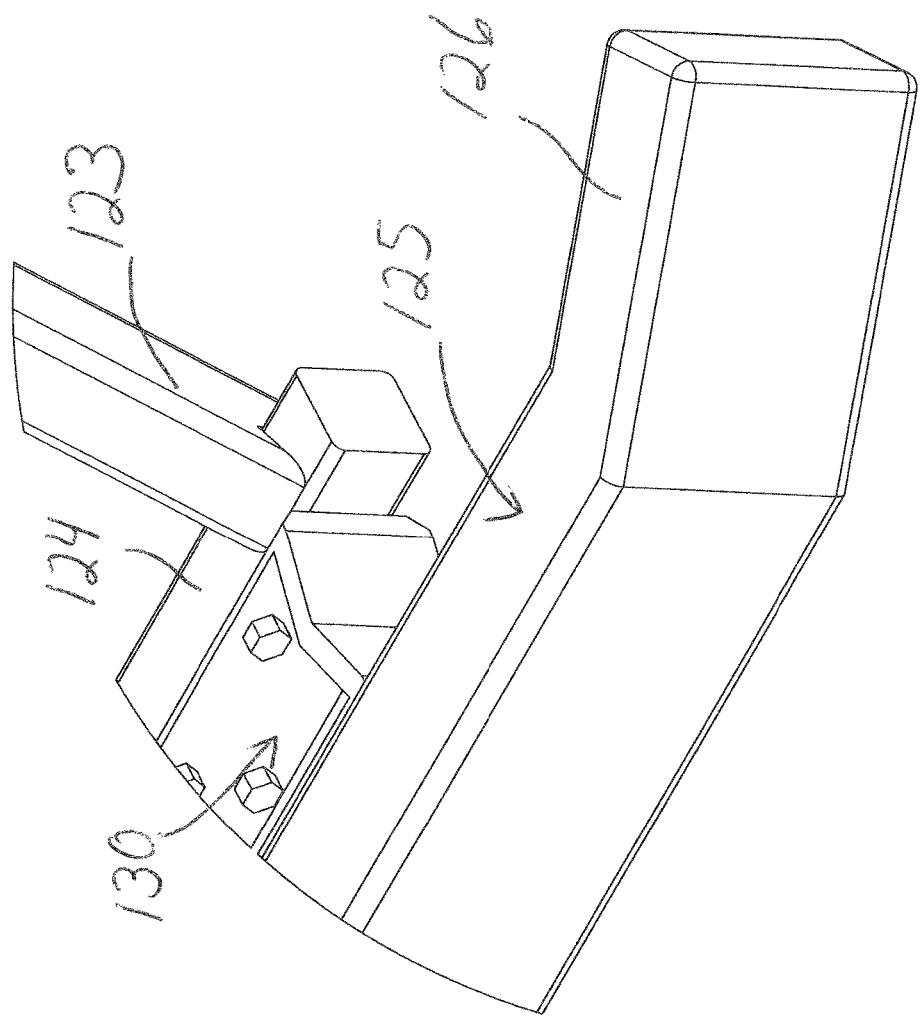
FIG. 24 is an enlarged perspective view of the right end of the rear main guard bar of the under-guard of FIG. 18, in the deployed position.

The improved rear main guard bar 125, as shown to best advantage in FIGS. 18, 20, and 24, features right and left ends each comprising angled deflection portions. These angled portions 126, 127 each extend at an angle of about 40 degrees to the length of the main portion of the rear main guard bar 125, for "catching" an impact that is not directly behind the rear main guard bar 125, but is instead slightly to the right or left. Thus, these portions 126, 127 provide corners/extensions on the guard bar 125 that help provide underride protection at the rear corners of the under-guard, and that also help protect the right and left sides of the under-guard in front of the guard bar 125, from damage due to impact. Alternatively or additionally, certain embodiments of the under-guard may comprise other types of force-dissipating and/or cushioning structures.

Figure 25:
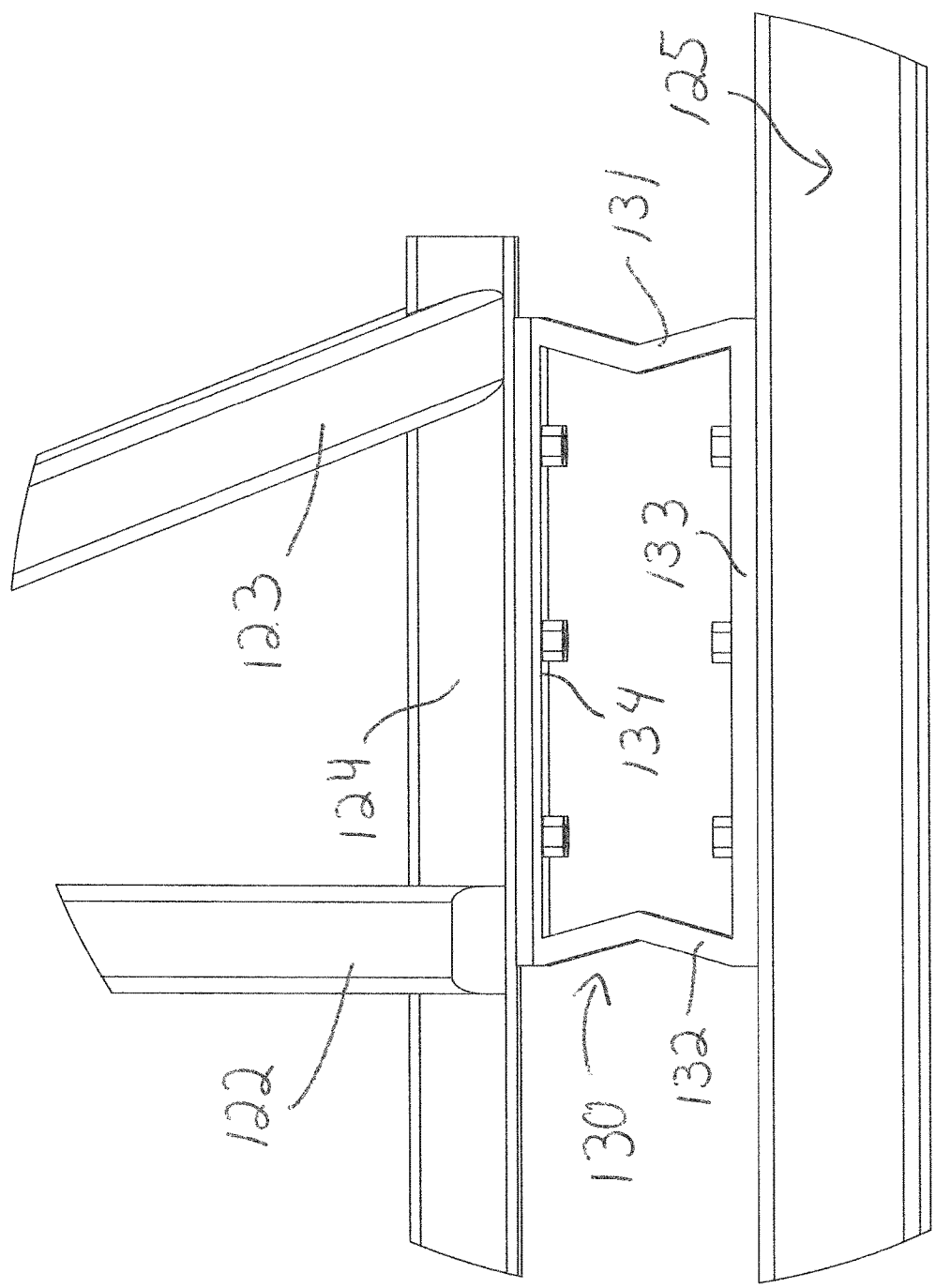
FIG. 25 is an enlarged top detail view of the connection of the rear main guard bar to other portions of the guard frame of the under-guard of FIG. 18.

The improved connection of the rear main guard bar 125, to other bars/members of the guard frame 120, is shown to best advantage in FIGS. 20, 24, and 25. The improved connection comprises one or more impact absorbers to absorb a substantial amount of the force on the rear main guard bar 125 during a collision or other impact on the bar 125. Each of the preferred two absorbers is a crumple cage 130 connecting the rear main guard bar 125 to the bars/beams 122, triangular bars 123, and reinforcing cross-member 124 of the guard frame 120. Each crumple cage 130 is generally rectangular, but with right and left ends 131, 132 being angled/curved inward, so that force against the rear side 133 of the rectangular cage will tend to bend ends 132, 132 to force the rear side 133 toward the front side 134. This collapses the cage 130, but, due to the cage walls preferably being rigid metal, a large amount of force/impact will be "absorbed" by the collapse, before and instead of the force/ impact reaching the bars/beams/members 122, 123, 124. Thus, the crumple cages 130 are "sacrificed" to protect both the main guard bar 125, the other portions of the guard frame 120, and other portions of the under-guard that connect/contact portions of the guard frame 120. For example, after an impact on the main guard bar 125, repair of the under-guard 100 may be limited to replacing the crumple cage(s) 130, rather than repairing or replacing other portions of the under-guard.

The improved actuator frame 150 comprises additional bracing, shown to best advantage in FIGS. 21, 22, and 26, to ensure the durability and reliability of the frame 150 during impact and/or over time. For example, braces such as gussets 156 are provided at/near the corners between parallel right and left bars 153, 154 with cross-bar 155. The right and left gussets 156 are both inside the generally rectangular U-shaped frame 150, that is, on the sides of the bars 153, 154 opposite of the pins 160 and of the slanted plates 172. Therefore, the gussets 156 are not near, and do not interfere with, the cooperation of pins 160 with hooks 165 or the cooperation of plates 171 with plates 172 discussed above for under-guard 10. Certain embodiments may be described as: an under-guard for a vehicle or equipment (for simplicity, a "truck"), preferably a dual-purpose truck that travels on-road and off-road, for preventing a vehicle in a collision with the truck from under riding the truck by entering a space between a road surface and a truck chassis beam that is higher than the vehicle; the under-guard comprising, consisting essentially of, or consisting of: a connector for connecting the under-guard to the truck; a guard frame; and an actuator frame; wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 15-70 degrees so that the main guard bar is lower that the connector for being in said space between the road and the chassis beam; wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and wherein, when said actuator frame pivots from the raised position toward the lowered position, the guard frame pivots down by gravity toward the deployed position while said at least one outer-end portion moves slides forward along said surface of the guard frame. While preferably being planar or generally planar, for compact retraction as discussed above, certain embodiments of each of the guard frame and the actuator frame may be of a) various frame shapes (triangular, rectangular, and/or other shapes); and b) various frame styles (for example, a framework of bars or posts fixed together, solid or partially solid plate(s), hollow or solid members fixed together, and/or a combination of these), with the preferred style being rigid elongated members fixed together to form an extremely strong framework that is light enough to raise and lower, as described herein, with a single hydraulic or pneumatic cylinder, for example. The terms "front end" and "rear end" are used in this paragraph and elsewhere in this Description and/or the claims, and this terminology is used to orient the reader regarding the under-guard portions and movements, but not necessarily to require a certain installation or orientation on the truck. For example, the under-guard may be installed, at/near the rear end of the truck in which case the rear end of the under-guard would be at/near the rear of the outer perimeter of the truck. But, the under-guard could also/instead be installed at a right side, left side, or front of a truck, in which case the "rear end" of the under-guard would not be at/near the rear end of the truck, but at/near a right side, left side, or a front, of the perimeter of the truck, for example. Further, the terms "retracted position" and "deployed position" are used in many places in the Description regarding each of the guard frame and the actuator frame, but the terms "raised position" and "lowered position" are used for the actuator frame especially in this paragraph and/or the claims in order to help clarify for the reader the positions and movement of the two different frames (actuator frame vs. the guard frame).

In certain of the embodiments described by the paragraph immediately above, the under-guard further comprises an actuator connected at a front end to the connector, and at a rear end to the actuator frame, wherein the actuator is adapted to shorten in length to pivot the actuator frame from said raised position to said lowered position. The actuator may, in certain embodiments, automatically pivot the actuator frame to the lowered position, so that the guard frame pivots to the deployed position, when the truck travels at a predetermined speed that indicates the truck has entered the road. The actuator, when fully-shortened, preferably restrains the actuator frame in the lowered position to retrain/restrain the guard frame in the deployed position. The guard frame may further comprise on said surface a hook/hook-system that opens toward the rear end of the guard frame, and wherein the guard frame is further retained/restrained in said deployed position by said at least one outer-end portion of the actuator frame being received in the hook. This hook/hook-system is preferably adapted so that the guard frame is restrained from pivoting upward from the deployed position by the hook receiving the at least one outer-end portion. The under-guard may further comprise the actuator frame comprising a first plate having a stop surface, and the guard frame comprising a second plate having a stop surface, wherein, when the actuator frame is in the lowered position and the guard frame is in the deployed position, said first plate stop surface and said second plate stop surface are parallel and contacting each other, to further retrain the guard frame in the deployed position. The first plate stop surface and said second plate stop surface are preferably at a slanted angle relative to horizontal and each of the first plate and the second plate has a lower edge and an upper edge that is rearward of the lower edge. The slanted angle is preferably in the range of 40-50 degrees. The guard frame is restrained in the deployed position by the guard frame resting by gravity on said at least one outer-end portion of the actuator frame in the lowered position, by a hook on said surface of the guard frame receiving the at least one outer-end portion, and by a first plate on the guard frame and a second plate on the actuator frame contacting each other at a slanted angle in the range of 40-50 degrees to horizontal when the guard frame is in the deployed position and the actuator frame is in the lowered position. The guard frame in certain embodiments has a right bar and a left bar each extending between the front end and rear end of the guard frame, for example, provided by a rectangular frame portion of the guard frame, and the actuator frame in certain embodiments is generally rectangular and has a right side and a left side; the at least one outer-end portion may comprise a horizontal right extension from the right side that extends underneath and slides along said right bar, and the at least one outer-end portion comprises a horizontal left extension from the left side that extends underneath and slides along said left bar, so that the guard frame in supported at said right bar and said left bar when in the retracted position, in the deployed position, and during pivoting between the retracted position and the deployed position. The guard frame may include, in addition to the rectangular frame portion, additional right and left members that lie in the same central plane as the rectangular frame portion, but that extend at angle(s) relative to the right and left bars, to fixedly and rigidly connect to the far right and far left ends of the main guard bar, thus increasing the overall strength of the guard frame. The under-guard may further comprise at least one shock-absorbing member, preferably connecting the main guard bar to the guard frame, that absorbs force upon a collision of the vehicle with the main guard bar. In certain embodiments, the shock-absorbing member(s) comprise(s) crumple cages that collapse upon said collision with the main guard bar, so that damage is likely done to only the easily-replaceable crumple cages and not to other portions of the under-guard. The connector may be a frame wrap having a horizontal member for extending underneath one or more truck chassis beams and two upending members for extending vertically along sides of the one or more truck chassis beams. When the actuator frame is in the raised position and the guard frame is in the retracted position, the actuator frame and guard frame preferably each extend less than 8 inches down from the horizontal member of the connector.

It will be understood from the drawings and this Description, that the frame wrap will frequently be installed on chassis beam(s) that run longitudinally on the truck; and when under-guard is installed on the rear or the front of the truck, the guard and actuator frames' lengths will typically be parallel to the length of the beam(s) and also parallel to the length of the frame wrap. However, the guard and actuator frames' lengths may be transverse to those longitudinal truck beams and the length of the frame wrap, when the under-guard is installed on a right side or left side of the truck, and/or the under-guard may be installed on truck structure other than said longitudinal chassis beam(s).

Certain embodiments may be described as an under-guard for a vehicle or equipment (for simplicity, a "truck"), preferably a dual-purpose truck that travels on-road and off-road, the under-guard comprising, consisting essentially of, or consisting of: a connector for attaching the under-guard to the vehicle; a guard frame having a front end pivotally connected to the connector, and a rear end having a rearmost extremity that is a main guard bar, the guard frame being pivotal from a generally horizontal retracted position and to a deployed position at an angle relative to horizontal that places said main guard bar lower than said front end; an actuator frame that moves the guard frame between said retracted position and said deployed position, the actuator frame having a top end pivotally connected to the connector rearward of the front end of the guard frame, and a bottom end that slidably extends underneath a portion of the guard frame, wherein the actuator frame pivots between a generally horizontal raised position that places the bottom end near the connector and supports the guard frame in the deployed position, and a lowered position extending generally vertically downward away from the connector so that the guard frame pivots by gravity to the deployed position and is held in the deployed position by the bottom end of the actuator frame underneath said portion of the guard frame.

Figure 9:
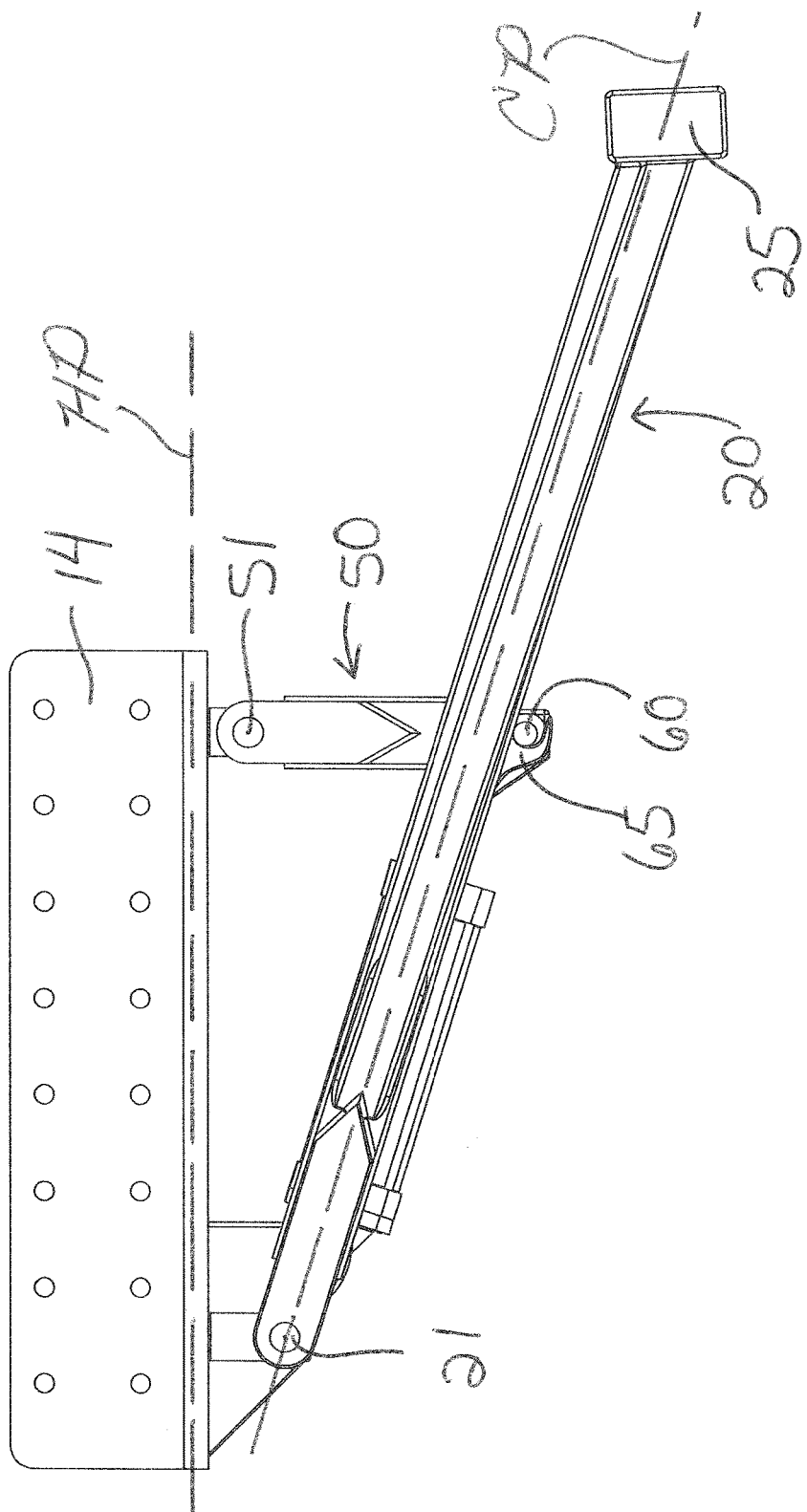
FIG. 9 is a left side view of the under-guard of FIG. 1 in the deployed position.
Figure 10:
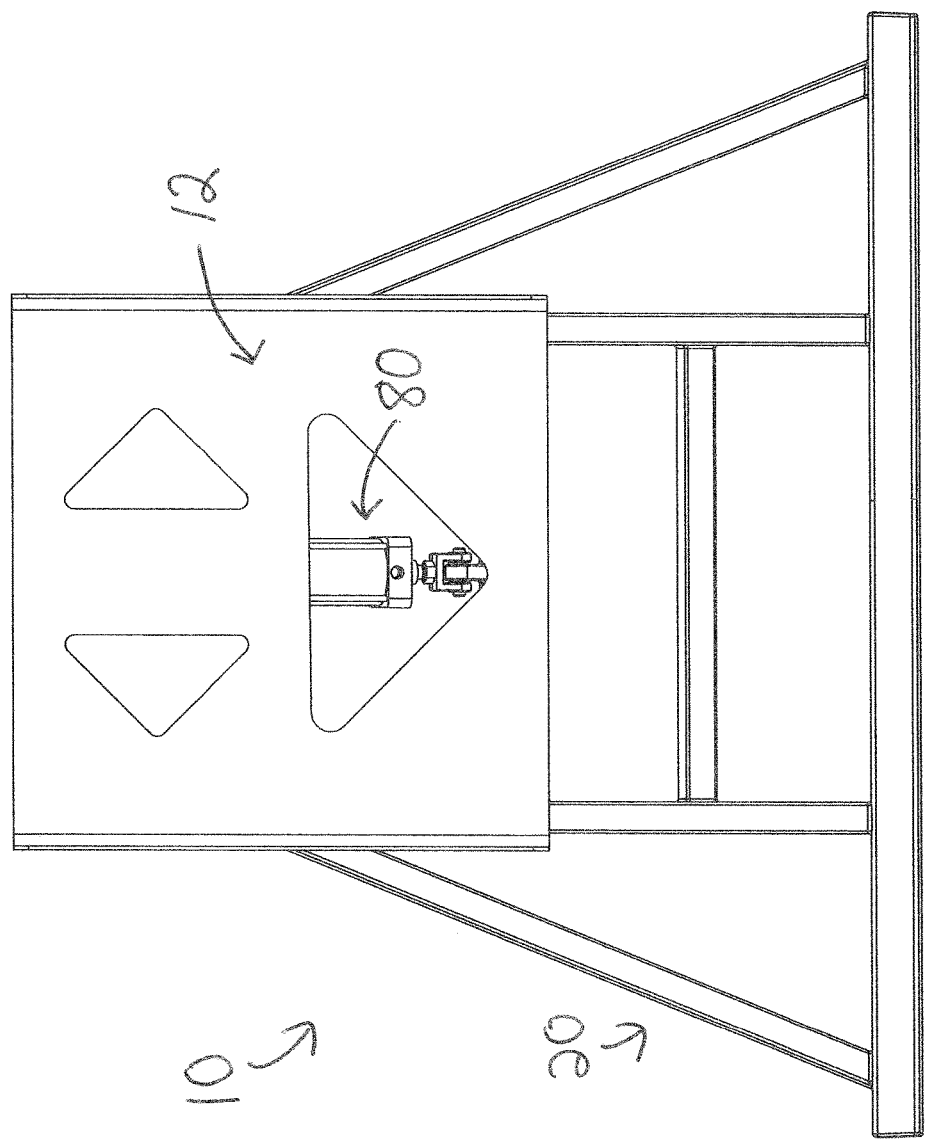
FIG. 10 is a top view of the under-guard of FIG. 1 in the deployed position.

In certain embodiments, the central plane CP of the guard frame is generally horizontal (within 5 degrees, and more preferably within 3 degrees, of horizontal) when in the retracted position (see FIG. 1), and the central plane CP of the guard frame, when in the deployed position, is at an angle relative to horizontal in the range of about 25-70 degrees, more preferably in a range of 15-45 degrees, or more preferably in a range of 15-25 degrees (see FIG. 9).

In the specification and drawings of this Application, and the specification, drawings, and photos of Provisional Application incorporated herein, reference is made to particular features (including method steps) of certain embodiments. It is to be understood that the disclosure of the invention includes all possible combinations of such particular features. For example, where a particular feature is disclosed in the context of a particular aspect, a particular embodiment, or a particular Figure, that feature can also be used, to the extent appropriate, in the context of other particular aspects, embodiments, and Figures, and in the invention generally. For example, many features and operation steps of under-guard 10 will be understood to apply to under-guard 100, though not detailed specifically above for under-guard 100, as will be understood from this paragraph. Further, while embodiments of the invention have been described above with reference to particular means, materials and embodiments, it is to be understood that the invention is not limited to these disclosed particulars, but extends instead to all equivalents within the broad scope of this disclosure, including the text of this document, the drawings, and the following claims.

The invention claimed is:

1. An under-guard, for a truck for preventing a vehicle in a collision with the truck from under riding the truck by entering a space between a road surface and a truck chassis beam that is higher than the vehicle, the under-guard comprising:
   a connector for connecting the under-guard to the truck;
   a guard frame; and
   an actuator frame;
   wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 25-70 degrees so that the main guard bar is lower that the connector for being in said space between the road and the chassis beam;
   wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and
   wherein, when said actuator frame pivots from the raised position toward the lowered position, the guard frame pivots down by gravity toward the deployed position while said at least one outer-end portion moves slides forward along said surface of the guard frame; and
   the under-guard further comprising an actuator connected at a front end to the connector, and at a rear end to the actuator frame, wherein the actuator is adapted to shorten in length to pivot the actuator frame from said raised position to said lowered position.

2. The under-guard as in claim 1, wherein the actuator automatically pivots the actuator frame to the lowered position, so that the guard frame pivots to the deployed position, when the truck exceeds a speed that indicates the truck has entered the road to travel at road speeds.

3. The under-guard as in claim 1, wherein the actuator, when fully-shortened, restrains the actuator frame in the lowered position to retrain the guard frame in the deployed position.

4. The under-guard as in claim 1, wherein the guard frame further comprises on said surface a hook that opens toward the rear end of the guard frame, and wherein the guard frame is further retained in said deployed position by said at least one outer-end portion of the actuator frame being received in the hook.

5. The under-guard as in claim 4, wherein the guard frame is restrained from pivoting upward from the deployed position by said hook receiving the at least one outer-end portion.

6. The under-guard as in claim 4, wherein the actuator comprises a first plate having a stop surface, and the guard frame comprised a second plate having a stop surface, wherein, when the actuator frame is in the lowered position and the guard frame is in the deployed position, the first plate stop surface and the second plate stop surface are parallel and contacting each other, to further retrain the guard frame in the deployed position.

7. The under-guard as in claim 6, wherein the first plate stop surface and the second plate stop surface are at a slanted angle in the range of 40-50 degrees to horizontal and each of the first plate and the second plate has a lower edge and an upper edge that is rearward of the lower edge.

8. An under-guard, for a truck for preventing a vehicle in a collision with the truck from under riding the truck by entering a space between a road surface and a truck chassis beam that is higher than the vehicle, the under-guard comprising:
   a connector for connecting the under-guard to the truck;
   a guard frame; and
   an actuator frame;
   wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 25-70 degrees so that the main guard bar is lower that the connector for being in said space between the road and the chassis beam;
   wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and
   wherein, when said actuator frame pivots from the raised position toward the lowered position, the guard frame pivots down by gravity toward the deployed position while said at least one outer-end portion moves slides forward along said surface of the guard frame; and
   wherein the guard frame is restrained in the deployed position by the guard frame resting by gravity on said at least one outer-end portion of the actuator frame in the lowered position, by a hook on said surface of the guard frame receiving the at least one outer-end portion, and by a first plate on the guard frame and a second plate on the actuator frame contacting each other at a slanted angle in the range of 40-50 degrees to horizontal when the guard frame is in the deployed position and the actuator frame is in the lowered position.

9. An under-guard, for a truck for preventing a vehicle in a collision with the truck from under riding the truck by entering a space between a road surface and a truck chassis beam that is higher than the vehicle, the under-guard comprising:
   a connector for connecting the under-guard to the truck;
   a guard frame; and
   an actuator frame;
   wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 25-70 degrees so that the main guard bar is lower that the connector for being in said space between the road and the chassis beam;
   wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and
   wherein, when said actuator frame pivots from the raised position toward the lowered position, the guard frame pivots down by gravity toward the deployed position while said at least one outer-end portion moves slides forward along said surface of the guard frame; and
   wherein the guard frame has a right bar and a left bar each extending between the front end and rear end of the guard frame, and wherein the actuator frame is generally rectangular and has a right side and a left side, the at least one outer-end portion comprises a horizontal right extension from the right side that extends underneath and slides along said right bar, and the at least one outer-end portion comprises a horizontal left extension from the left side that extends underneath and slides along said left bar, so that the guard frame in supported at said right bar and said left bar when in the retracted position, in the deployed position, and during pivoting between the retracted position and the deployed position.

10. An under-guard, for a truck for preventing a vehicle in a collision with the truck from under riding the truck by entering a space between a road surface and a truck chassis beam that is higher than the vehicle, the under-guard comprising:
   a connector for connecting the under-guard to the truck;

a guard frame; and an actuator frame;

wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 25-70 degrees so that the main guard bar is lower that the connector for being in said space between the road and the chassis beam;

wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and wherein, when said actuator frame pivots from the raised position toward the lowered position, the guard frame pivots down by gravity toward the deployed position while said at least one outer-end portion moves slides forward along said surface of the guard frame; and wherein the actuator frame comprises a first plate having a stop surface, and the guard frame comprised a second plate having a stop surface, wherein, when the actuator frame is in the lowered position and the guard frame is in the angled deployed position, said first plate stop surface and said second plate stop surface are parallel and contacting each other, to restrain the guard frame in the angled deployed position.

11. The under-guard as in claim 10, wherein the first plate stop surface and the second plate stop surface are at a slanted angle in the range of 40-50 degrees to horizontal and each of the first plate and the second plate has a lower edge and an upper edge that is rearward of the lower edge.

12. The under-guard as in claim 10, wherein the guard frame comprises at least one shock-absorbing member connecting the main guard bar to the guard frame and that absorbs force upon a collision of the vehicle with the main guard bar.

13. The under-guard as in claim 12, wherein the at least one shock-absorbing member comprises two crumple cages that collapse upon said collision with the main guard bar.

14. An under-guard, for a truck for preventing a vehicle in a collision with the truck from under riding the truck by entering a space between a road surface and a truck chassis beam that is higher than the vehicle, the under-guard comprising:

a connector for connecting the under-guard to the truck;

a guard frame; and an actuator frame;

wherein the guard frame has a front end and a rear end comprising a horizontal main guard bar, the guard frame being pivotally connected to the connector at or near the front end so that the guard frame is pivotal from a generally horizontal retracted position near the connector down to an angled deployed position extending down and rearward from the connector at an angle in the range of 25-70 degrees so that the main guard bar is lower that the connector for being in said space between the road and the chassis beam;

wherein the actuator frame has an inner end that is pivotally connected to the connector and at least one outer-end portion that extends underneath a surface of the guard frame, the actuator frame being pivotal relative to the connector from a generally horizontal raised position near the connector in which the actuator frame supports the guard frame in said retracted position, to a generally vertical lowered position extending down from the connector, wherein the actuator frame supports the guard frame in the angled deployed position, and wherein, when said actuator frame pivots from the raised position toward the lowered position, the guard frame pivots down by gravity toward the deployed position while said at least one outer-end portion moves slides forward along said surface of the guard frame; and wherein the connector is a frame wrap having a horizontal main plate for extending underneath one or more truck chassis beams and two upending plates for extending vertically along sides of the one or more truck chassis beams.

15. The under-guard as in claim 14, wherein, when the actuator frame is in the raised position and the guard frame is in the retracted position, the actuator frame and guard frame each extend less than 8 inches down from the horizontal member of the connector.

16. An under-guard for vehicle, the under-guard comprising:

a connector for attaching the under-guard to the vehicle;

a guard frame having a front end pivotally connected to the connector, and a rear end having a rearmost extremity that is a main guard bar, the guard frame being pivotal from a generally horizontal retracted position and to a deployed position at an angle in the range of 25-70 degrees that places said main guard bar lower than said front end;

an actuator frame that moves the guard frame between said retracted position and said deployed position, the actuator frame having a top end pivotally connected to the connector rearward of the front end of the guard frame, and a bottom end that slidably extends underneath a portion of the guard frame, wherein the actuator frame pivots between a generally horizontal raised position that places the bottom end near the connector and supports the guard frame in the deployed position, and a lowered position extending generally vertically downward away from the connector so that the guard frame pivots by gravity to the deployed position and is held in the deployed position by the bottom end of the actuator frame underneath said portion of the guard frame;

the under-guard further comprising an actuator powering the actuator frame to pivot between the raised position and the lowered position and adapted to limit the actuator from pivoting forward from the lowered position;

wherein the guard frame comprises a hook that opens toward the rear end, and the bottom end of the actuator frame is received in the hook when the actuator frame is in the lowered position to limit the guard frame from pivoting rearward upon an impact on a front side of the guard frame.

17. The under-guard as in claim 16, wherein the actuator frame comprises a first plate having a stop surface, and the guard frame comprised a second plate having a stop surface, wherein, when the actuator frame is in the lowered position and the guard frame is in the deployed position, the first plate stop surface and the second plate stop surface are contacting each other, parallel to each other, and slanted angle in the range of 40-50 degrees to horizontal, with each of the first plate and the second plate having a lower edge and an upper edge that is rearward of the lower edge.

18. The under-guard as in claim 16, wherein the guard frame comprises at least one shock-absorbing member connecting the main guard bar to the guard frame and that absorbs force upon a collision of the vehicle with the main guard bar.

19. The under-guard as in claim 18, wherein the at least one shock-absorbing member comprises two crumple cages that collapse upon said collision with the main guard bar.

20. The under-guard as in claim 16, wherein the connector is a frame wrap having a horizontal member for extending underneath one or more truck chassis beams and two upending members for extending vertically along sides of the one or more truck chassis beams.

21. The under-guard as in claim 20, wherein, when the actuator frame is in the raised position and the guard frame is in the retracted position, the actuator frame and guard frame each extend less than 8 inches down from the horizontal member of the connector.

* * * * *